(12) United States Patent
Hanson et al.

(10) Patent No.: US 12,731,999 B2
(45) Date of Patent: Sep. 8, 2026

(54) SCALABLE, BUFFERED DIFFERENTIAL POWER PROCESSING ARCHITECTURE

(71) Applicant: BOARD OF REGENTS, THE UNIVERSITY OF TEXAS SYSTEM, Austin, TX (US)

(72) Inventors: Alex Hanson, Austin, TX (US); Michael Solomentsev, Austin, TX (US); Vincent Pierre Antonio Molina, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 19/202,645

(22) Filed: May 8, 2025

(65) Prior Publication Data

US 2025/0350123 A1 Nov. 13, 2025

Related U.S. Application Data

(60) Provisional application No. 63/644,472, filed on May 8, 2024.

(51) Int. Cl.

| | |
|---|---|
| ***B60L 53/51*** | (2019.01) |
| ***B60R 16/033*** | (2006.01) |
| ***H02J 3/32*** | (2026.01) |
| ***H02J 3/38*** | (2006.01) |
| ***H02J 9/06*** | (2006.01) |
| ***H02M 3/335*** | (2006.01) |
| *H02J 101/24* | (2026.01) |

(52) U.S. Cl.
CPC .............. *H02J 3/38* (2013.01); *B60R 16/033* (2013.01); *H02J 3/32* (2013.01); *H02J 9/06* (2013.01); *H02M 3/33571* (2021.05); *H02M 3/33584* (2013.01); *B60L 53/51* (2019.02); *H02J 2101/25* (2026.01)

(58) Field of Classification Search
CPC ........ H02J 3/38; H02J 3/32; H02J 9/06; H02J 2101/25; H02J 7/35; B60R 16/033; H02M 3/33571; H02M 3/33584; B60L 53/51
See application file for complete search history.

(56) References Cited

U.S. PATENT DOCUMENTS

2012/0299386 A1* 11/2012 Kaufman .................. G05F 3/08 323/311
2016/0079761 A1* 3/2016 Pilawa-Podgurski ..... G05F 1/67 307/77

(Continued)

*Primary Examiner* — Elim Ortiz
(74) *Attorney, Agent, or Firm* — Meunier Carlin & Curfman LLC

(57) ABSTRACT

An exemplary system and method are disclosed for power control of a set of power sources or loads employing a differential power processing (DPP) assembly having a set of DPP units coupled to an energy storage module in a bus, in which the energy storage module is extensively sized to mitigate transient conditions propagated by the set of power sources or loads to provide an extended controllable time window for the individual DPP unit to reduce control requirements for the DPP units. The individual DPP unit in the assembly would push or pull, differentially, only power to the power source or load to minimize its respective operation while maximizing the utilization of the respective power source or maintaining stability of the bus for the loads.

20 Claims, 20 Drawing Sheets

(56) References Cited

U.S. PATENT DOCUMENTS

| | | | | |
|---|---|---|---|---|
| 2016/0181816 | A1* | 6/2016 | Kinnard | H02J 4/00 307/29 |
| 2017/0063094 | A1* | 3/2017 | Chapman | H02M 3/1584 |
| 2022/0045628 | A1* | 2/2022 | Chen | H02M 3/33561 |
| 2024/0158107 | A1* | 5/2024 | Edpuganti | B64G 1/443 |

* cited by examiner

210
$I_{string} = 0A$
202n
3V 1A
202b
3V 0.5A
202a
3V 1A
212
$I_{lvb} = 0.625A$
108'
210
$I_{string} = 0.83A$
3V 1A
3V 0.5A
3V 1A
212
$I_{lvb} = 0A$
108'
222
220
HV charges LV
Both batteries charging
LV charges HV
214
$I_{string}$
$I_{string} = 0A$
218
215
$I_{lvb} = 0A$
216

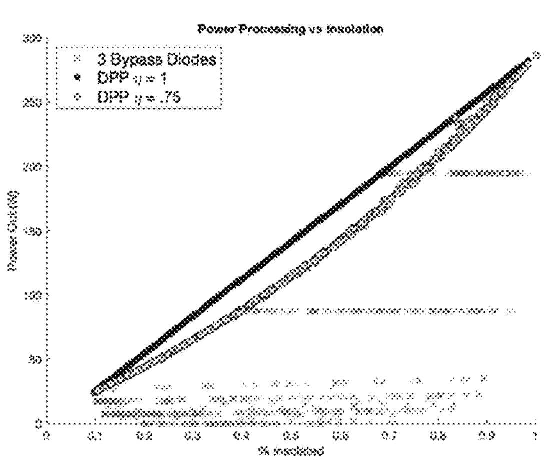
FIG. 5A
Power Processing vs Insolation
3 Bypass Diodes
1 cell per DPP
6 cells per DPP
FIG. 5B
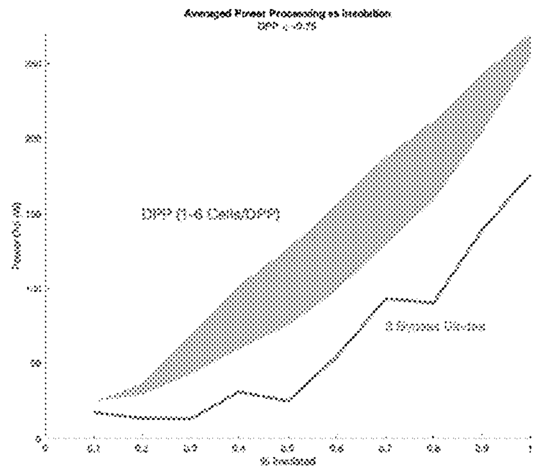
FIG. 5C
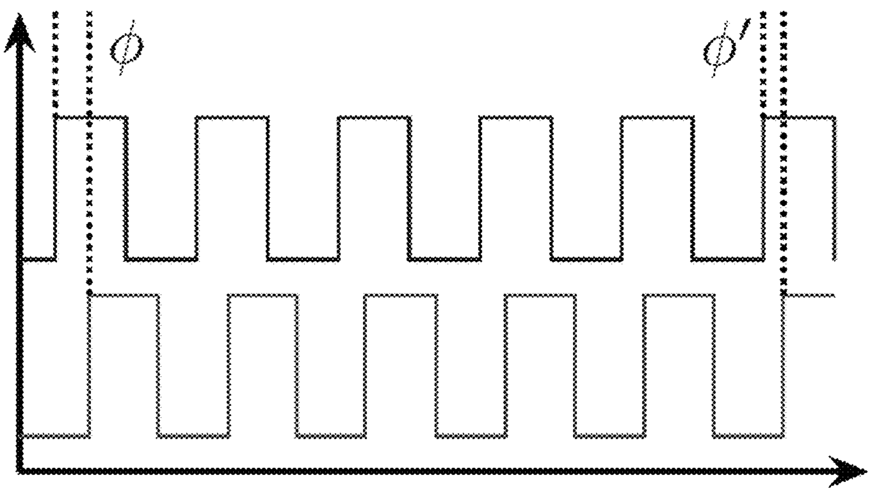
FIG. 5D

SCALABLE, BUFFERED DIFFERENTIAL POWER PROCESSING ARCHITECTURE

RELATED APPLICATION

This U.S. application claims priority to, and the benefit of, U.S. Provisional Patent Application No. 63/644,472, filed May 8, 2024, entitled "SCALABLE, BUFFERED DIFFERENTIAL POWER PROCESSING ARCHITECTURE," which is incorporated by reference herein in its entirety.

GOVERNMENT SUPPORT CLAUSE

This invention was made with government support under Grant No. EEC2052814, awarded by the National Science Foundation. The government has certain rights in the invention.

BACKGROUND

Typical solar installations can fall far short of harvesting the incident power capable of being generated by PV hardware due to partial shading on a panel. Stationary utility-scale and residential solar installations may also have similar issues with partial shading and mismatch. Traditional solar panels often employ bypass diodes connected in parallel with sections of PV strings to allow current to bypass a section affected by partial shading. The solution is not optimal. The forward voltage drop of a diode can be commensurate with that of a solar cell. DC optimizer can be alternatively or additionally used as an intermediary between sets of PV cells and the power converter outputs, which may be in parallel (e.g., microinverter architecture) or series, adding hardware to the solution.

Differential power processing (DPP) converters have been utilized in photovoltaic (PV) power systems to achieve high-efficiency power output at uneven lighting or mismatched PV cell operations. DPP systems are highly coupled and can be challenging to control.

Additionally, while DPP was introduced for PV systems, various topologies and control algorithms have been proposed and validated for DPP converter systems over existing series string and full power processing converter topologies, e.g., for data centers.

There is a benefit to improving power systems with DPP units.

SUMMARY

An exemplary system and method are disclosed for power control of a set of power sources or loads employing a differential power processing (DPP) assembly having a set of DPP units coupled to an energy storage module, in an isolated bus, in which the energy storage module is extensively sized to mitigate transient conditions propagated by the set of power sources or loads to provide an extended controllable time window for the individual DPP unit to reduce control requirements for the DPP units. The individual DPP unit in the assembly would push or pull, differentially, only power to the power source or load to minimize its respective operation while maximizing the utilization of the respective power source or maintaining the stability of the bus for the loads.

Conventionally, individual power controllers have to communicate with each other or with a centralized converter and share information and control behavior to ensure power is not overly pushed or pulled from a capacitor. The DPP unit, while implemented with real-time control to one another or not, with the extended controllable time window from the energy storage module removes this requirement on the controls, providing an eloquent implementation for existing (e.g., as a retrofit) and new power system (e.g., as a new system design). In certain infrastructures, such as electric vehicles or combustion-engine vehicles, the onboard battery would be extensively sized as the energy storage module for this purpose. To this end, the exemplary system and method can be integrated or implemented in such infrastructure with minor electronic hardware having minimal control requirements and wiring updates.

As used herein, the term "extensively sized" refers to the size of the energy storage is one or more orders of magnitude greater than that required to address the transient conditions expected to be propagated or induced by the set of power sources or loads and maintain the power system in a pre-defined operating envelope (e.g., within pre-defined bus voltage envelope).

The DPP assembly, in the example of PV cells, would allow a string of power sources (e.g., PV cells), which would otherwise be limited in total output power for the string if one unit in the strin=g (e.g., one or some of the PV cells) was limited in its output, e.g., due to partial shading, to be operable at the maximum utilization (e.g., maximum power point tracking for PV cells). The DPP is configured to control the voltage that appears across, and/or the current that flows through, one or more PV cells.

In the example of uninterruptible power supply (UPS), the DPP assembly can maintain a high-quality voltage bus for servers in data centers at an optimal power utilization point, e.g., pushing or pulling, differentially, only power to the load as the load fluctuates during its operation.

In an aspect, a system is disclosed comprising a plurality of differential power processing (DPP) units, including a first DPP unit and a second DPP unit, each of the first DPP unit and the second DPP unit comprising a bi-directional converter having a first connection and a second connection, wherein the first connection of the first DPP unit and the first connection of the second DPP unit are connected (i) to a first set of variable power source or sink unit and a second set of variable power source or sink unit, respectively, wherein the first connection of the first DPP unit is coupled to the first variable power source or sink unit and is configured to push or pull, differentially, power for the first variable power source or sink unit when there is a mismatch (e.g., in generated power/usage, output voltage, etc.) between the first variable power source or sink unit and another variable power source or sink unit, and wherein the first connection of the second DPP unit is coupled to the second variable power source or sink unit and is configured to push or pull, differentially, power for the second variable power source or sink unit when there is a mismatch between the second power source or sink unit and another variable power source or sink unit; wherein each second connection of the plurality of DPP units is coupled to one or more energy storage units in an isolated bus, wherein the energy storage is sufficiently sized to mitigate transient conditions propagated from a plurality of variable power source or sink units, including the first and second variable power source or sink units, to be fully absorbed or drawn from the energy storage.

In some embodiments, each of the first DPP unit and a second DPP unit each includes a distributed controller, wherein the distributed controller of the first DPP unit is configured to track the power of the first variable power source or sink unit as a first photovoltaic cell without control input from other controllers of other DPP units, and wherein the distributed controller of the second DPP unit is configured to track power of the second variable power source or sink unit as a second photovoltaic cell without control input from other controllers of other DPP units.

In some embodiments, each of the first DPP unit and a second DPP unit each includes a distributed controller, wherein the distributed controller of the first DPP unit is configured to track the voltage of the first variable power source or sink unit as a first set of one or more rack servers (e.g., data center servers) without control input from other controllers of other DPP units, and wherein the distributed controller of the second DPP unit is configured to track power of the second variable power source or sink unit as a second set of one or more rack servers (e.g., data center servers) without control input from other controllers of other DPP units.

In some embodiments, each of the first DPP unit and a second DPP unit is connected to a central controller.

In some embodiments, the system includes a plurality of photovoltaic cells (e.g., vehicle PV) connected in series, including the first photovoltaic cell and the second photovoltaic cell; the energy storage (e.g., battery) coupled to the plurality of DPP units, the energy storage coupled in parallel connection to the second connection of each of the plurality of DPP units to form the isolated bus.

In some embodiments, the plurality of photovoltaic cells are integrated into a vehicle, wherein the battery is an onboard vehicle battery, the onboard vehicle battery is configured to provide an isolated bus tolerant to high-frequency power imbalances.

In some embodiments, the plurality of photovoltaic cells are integrated into a vehicle, wherein the battery is a 12-volt or 24-voltage onboard vehicle battery, the onboard vehicle battery is configured to provide an isolated bus tolerant to high-frequency power imbalances.

In some embodiments, the first DPP unit is configured to operate a maximum power point control for the first photovoltaic cell, wherein the second DPP unit is configured to operate a maximum power point control for the second photovoltaic cell.

In some embodiments, the energy storage is a rack-mounted uninterruptable power supply.

In some embodiments, the first variable power source or sink unit and the second variable power source or sink unit are computational loads (such as servers).

In some embodiments, the first DPP unit is configured to maintain constant voltage for a bus to a set of one or more computing equipment, wherein the second DPP unit is configured to maintain constant voltage for a bus to a second set of one or more computing equipment.

In some embodiments, each of the plurality of DPP units comprises a dual active half-bridge (DAHB) converter or a bidirectional converter.

In some embodiments, at least one of the plurality of DPP units comprises a dual active half-bridge (DAHB) converter or a bidirectional converter configured to operate at a switching frequency above 100 kHz.

In some embodiments, the plurality of DPP units each includes an integrated planar magnetic component.

In another aspect, a method is disclosed comprising providing a plurality of differential power processing (DPP) units, including a first DPP unit and a second DPP unit, each of the first DPP unit and the second DPP unit including a bi-directional converter having a first connection and a second connection; coupling the first connection of the first DPP unit to a first variable power source or sink unit, wherein the first connection of the first DPP is configured to push or pull, differentially, power for the first variable power source or sink unit when there is a mismatch (e.g., in generated power/usage, output voltage, etc.) between (i) the first variable power source or sink unit and (ii) another variable power source or sink unit; coupling the first connection of the second DPP unit to a second variable power source or sink unit, wherein the first connection of the second DPP is configured to push or pull, differentially, power for the second variable power source or sink unit when there is a mismatch between the second power source or sink unit and another variable power source or sink unit; and coupling each second connection of the plurality of DPP units to one or more energy storage units in a bus, wherein the energy storage is sufficiently sized to mitigate transient conditions propagated from a plurality of variable power source or sink units, including the first and second variable power source or sink units, to be fully absorbed or drawn from the energy storage.

In some embodiments, the method described herein further comprises controlling voltage appearing across, and/or current flowing through, the first variable power source or sink unit using a distributed controller of the first DPP unit without control input from other controllers of other DPP units; and controlling voltage appearing across, and/or current flowing through, the second variable power source or sink unit using a distributed controller of the second DPP unit without control input from other controllers of other DPP units.

In some embodiments, the method described herein further comprises tracking voltage of the first variable power source or sink unit using a distributed controller of the first DPP unit, as a first set of one or more rack servers (e.g., data center servers), without control input from other controllers of other DPP units; and controlling voltage appearing across, and/or current flowing through, the second variable power source or sink unit using a distributed controller of the second DPP unit, as a second set of one or more rack servers (e.g., data center servers), without control input from other controllers of other DPP units.

In some embodiments, the method described herein further comprises coupling a plurality of photovoltaic cells (e.g., vehicle PV), including a first photovoltaic cell and a second photovoltaic cell connected in series, to the plurality of DDP units; coupling an energy storage to the plurality of DPP units, the energy storage (e.g., battery) coupled in parallel connection to the second connection of each of the plurality of DPP units to form the bus.

In some embodiments, the plurality of photovoltaic cells are integrated into a vehicle, wherein the energy storage is an onboard vehicle battery, the onboard vehicle battery being configured to provide bus tolerant to high-frequency power imbalances.

In some embodiments, the first DPP unit is configured to operate a maximum power point control for the first photovoltaic cell, and wherein the second DPP unit is configured to operate a maximum power point control for the second photovoltaic cell.

Other systems, methods, features, and/or advantages will be or may become apparent to one with skill in the art upon examination of the following drawings and detailed description. It is intended that all such additional systems, methods, features, and/or advantages be included within this description and be protected by the accompanying claims.

BRIEF DESCRIPTION OF DRAWINGS

FIGS. 5A-5C depict simulated results between the exemplary system of FIGS. 2A and 2B as compared to conventional bypass diodes under partial shading conditions.

FIG. 5D shows examples of drifting phase shift error.

Figure 1A:
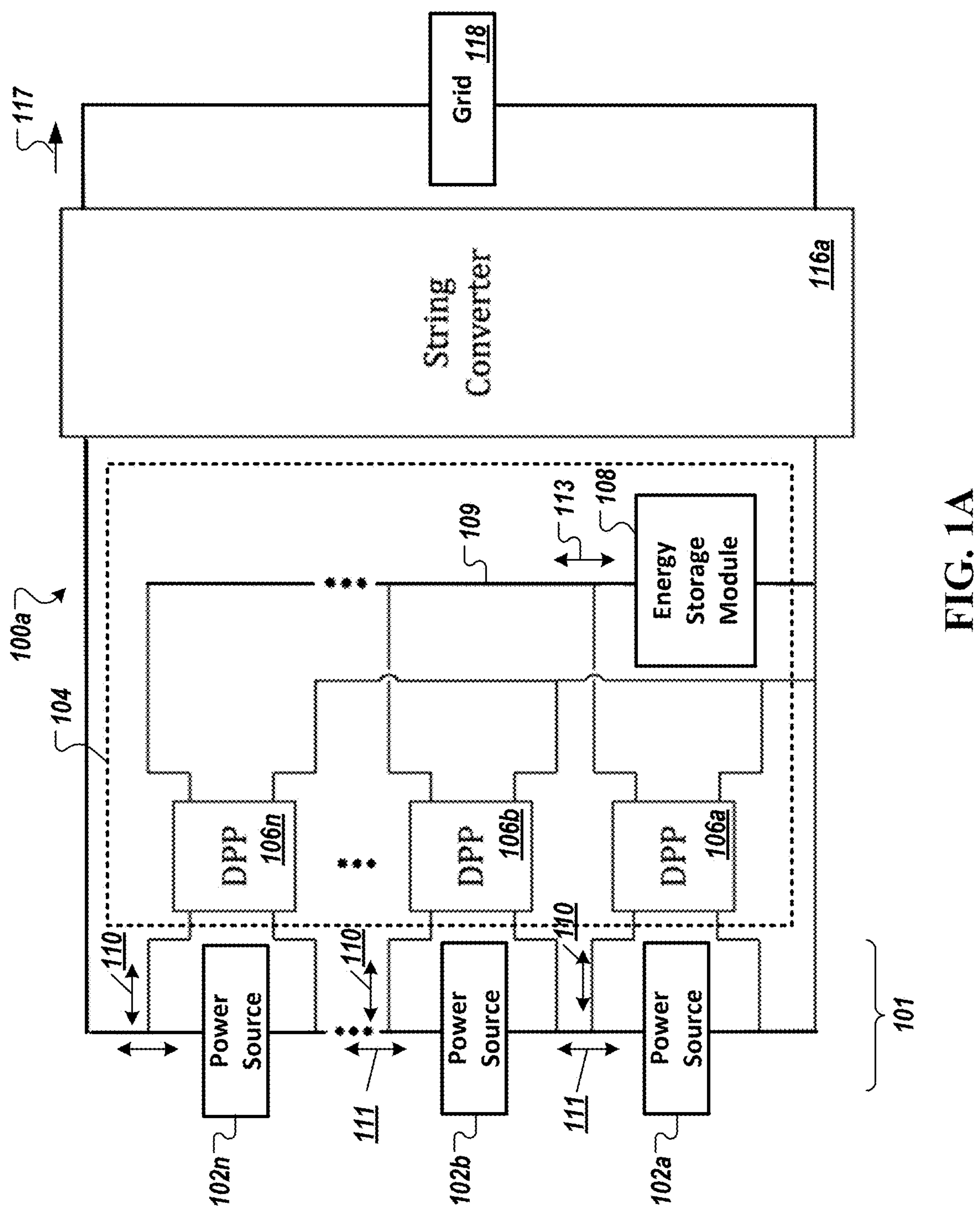
FIGS. 1A and 1B each shows an example system for power control of a string set of power sources or loads employing a differential power processing (DPP) assembly having a set of DPP units having an extended controllable time window for the individual DPP unit from a coupling to an extensively-sized energy storage module 108 in an isolated bus in accordance with an illustrative embodiment.

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

To facilitate an understanding of the principles and features of the present disclosure, various illustrative embodiments are explained below. The components, steps, and materials described hereinafter as making up various elements of the embodiments disclosed herein are intended to be illustrative and not restrictive. M any suitable components, steps, and materials that would perform the same or similar functions as the components, steps, and materials described herein are intended to be embraced within the scope of the disclosure. Such other components, steps, and materials not described herein can include, but are not limited to, similar components or steps that are developed after the development of the embodiments disclosed herein.

Some references, which may include various patents, patent applications, and publications, are cited in a reference list and discussed in the disclosure provided herein. The citation and/or discussion of such references is provided merely to clarify the description of the present disclosure and is not an admission that any such reference is "prior art" to any aspects of the present disclosure described herein. In terms of notation, "[n]" corresponds to the $n^{th}$ reference in the list. All references cited and discussed in this specification are incorporated herein by reference in their entireties and to the same extent as if each reference were individually incorporated by reference.

Example System

Figure 1B:
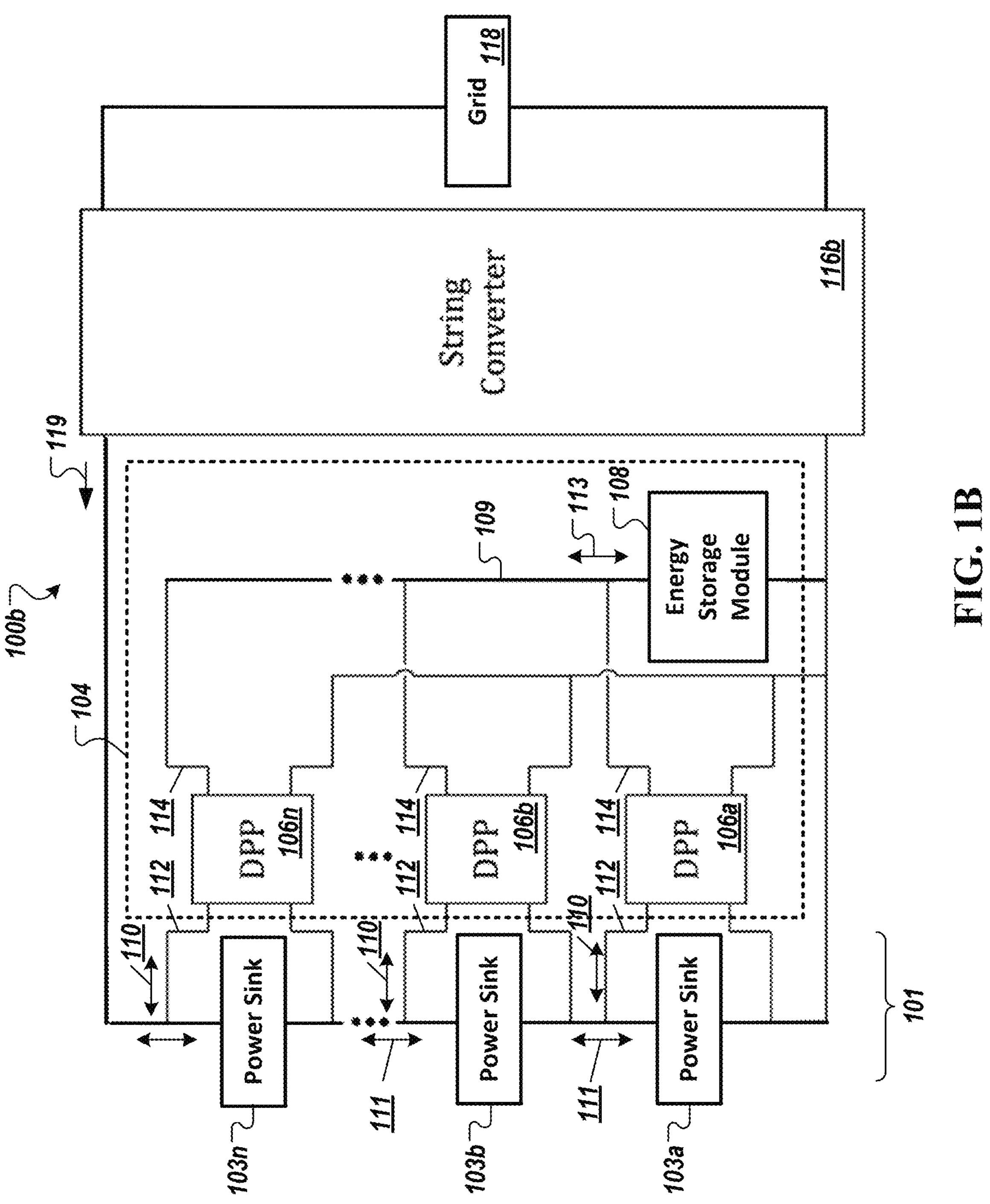

FIGS. 1A and 1B each shows an example system 100 (shown as 100*a*, 100*b*, respectively) for power control of a string set (101) of power sources or loads (shown as power source 102*a*, 102*b*, . . . , 102*n* in FIG. 1A and power sink 103*a*, 103*b*, . . . 103*n* in FIG. 1B) employing a differential power processing (DPP) assembly 104 having a set of DPP units 106 (shown as 106*a*, 106*b* . . . , 106*n*) having an extended controllable time window for the individual DPP unit from coupling to an extensively-sized energy storage module 108 in an isolated bus 109 in accordance with an illustrative embodiment.

In FIG. 1A, the power source (e.g., 102) may be photovoltaic cells, battery cells, or fuel cells that may be coupled to one another in a string configuration. In FIG. 1B, the power sink (e.g., 103) may be a rack-mounted rack server, e.g., in data centers, or real-time cryptocurrency hardware (e.g., A SIC miners) and similar hardware infrastructure. The energy storage module 108 may be batteries (e.g., on-board vehicle batteries) or an uninterruptible power supply.

While the individual power source (e.g., 102) typically sources power, the differential power processing (DPP) assembly 104 is configured to push and pull power (110) from the power source (102), from or into the energy storage module 108 (shown as 113), to mitigate transient events (111) at the power source in its connection in the string configuration 101. The energy storage module 108 is extensively sized to mitigate transient conditions propagated by the set of power sources or loads (e.g., 102) to provide an extended controllable time window for the individual DPP unit (e.g., 106*a*, 106*b*, . . . 106*n*) to reduce control requirements for the DPP units (e.g., 106). The individual DPP unit (e.g., 106) in the assembly 104 would push or pull, differentially, only power (110) to the power source or load (e.g., 102) to minimize its respective operation while maximizing the utilization of the respective power source or maintaining the stability of the bus for the loads.

In the example shown in FIG. 1, the system 100*a* includes a plurality of differential power processing (DPP) units 106, including the first DPP unit 106*a* and the second DPP unit 106*b*. Each of the first DPP unit and the second DPP unit includes a bi-directional converter having a (i) first connection 112 that connects to the power source or sink (e.g., 102) and (ii) a second connection 114 to the energy storage module 108 having one or more energy storage units in the isolated bus 109.

In FIG. 1A, the power sources 102*a*, 102*b*, . . . , 102*n* are coupled to a string converter 116 (shown as 116*a*) to output power (117) to the grid 118. In FIG. 1B, the power sinks 103*a*, 103*b*, . . . 103*n* are coupled with a string converter 116 (shown as 116*b*) to receive power (119) from the grid 118.

Method of Operation

Figures 2A, 2B:
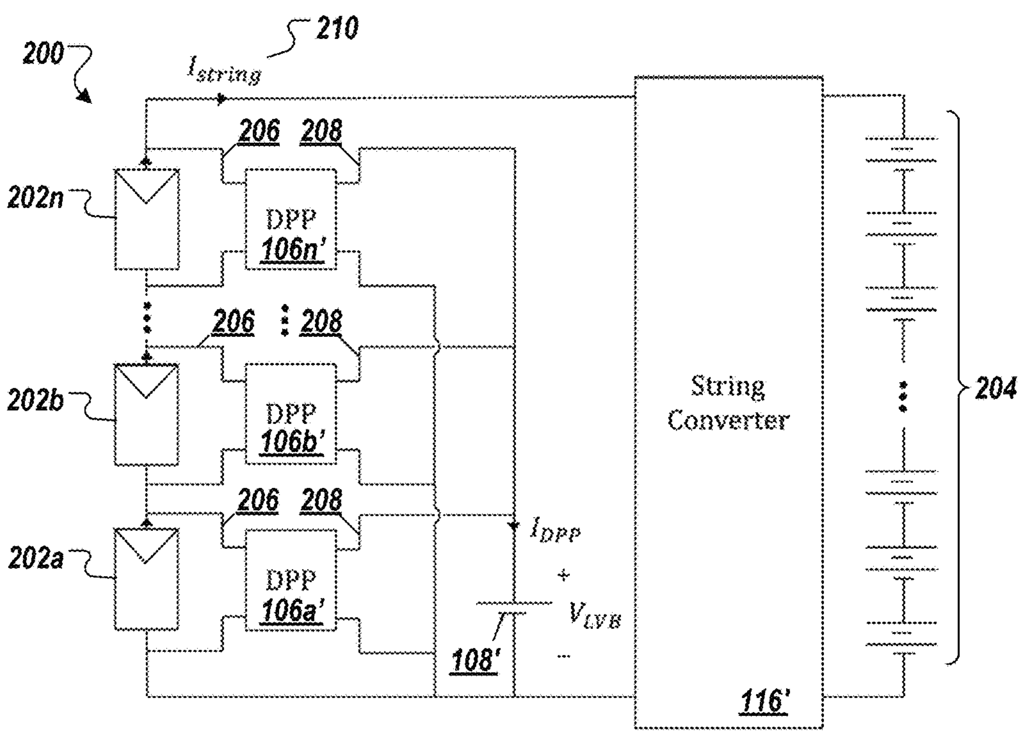
FIGS. 2A and 2B show a method of operation for the DPP assembly of FIG. 1A in accordance with an illustrative embodiment.
Figure 2C:
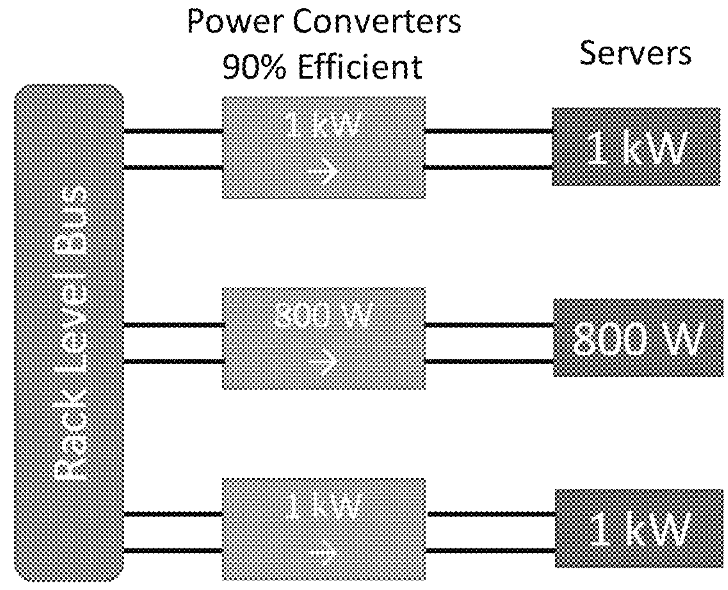
FIGS. 2C and 2D show a method of operation for the DPP assembly of FIG. 1B in accordance with an illustrative embodiment.
Figure 2D:
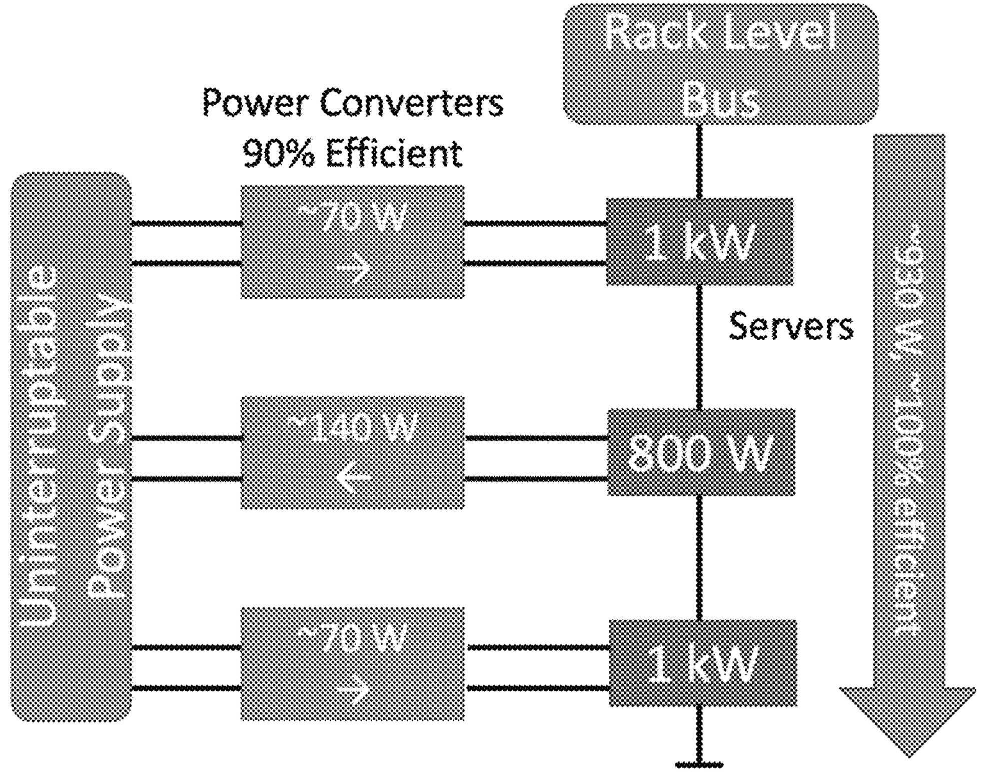

FIGS. 2A and 2B show a method 200*a* of operation for the DPP assembly of FIG. 1A. FIGS. 2C and 2D show a method 200*b* of operation for the DPP assembly of FIG. 1B.

PV infrastructure. In FIG. 2A, the system 100 (shown as 200) includes a PV string of any number of cells 202 (shown as 202*a*, 202*b*, . . . , 202*n*) coupled to differential power processing converters 106 (e.g., 106*a*, 106*b*, . . . , 106*n*; shown as 106*a*', 106*b*', . . . , 106*n*'), a vehicle low voltage battery (e.g., 12V) (e.g., 108; shown as 108'), and a vehicle on-board charger (e.g., 116*a*; shown as 116').

The vehicle on-board charger 116' is configured to act as the PV string converter and interface to the vehicle's high voltage battery 204. The primary connections 206 of the DPP modules are connected to the string of PV cells, which are otherwise in series, and the module secondaries 208 are connected in parallel to the low-voltage battery 108'. The system 200 is highly scalable because each individual DPP unit (106*a*', 106*b*', . . . , 106*n*') is only responsible for realizing the maximum power point of its corresponding PV cell(s) (202*a*, 202*b*, . . . , 202*n*). In a well-matched insolation scenario, the converters (106*a*', 106*b*', . . . , 106*n*') will not need to process any power. Depending on shading conditions and string current 210, each bidirectional converter (106*a*', 106*b*', . . . , 106*n*') would transfer energy to or from the low-voltage battery 108'.

While FIG. 2A shows each module connected to one cell each, the operation and system may be configured across multiple cells, e.g., where desirable to reduce costs by having each DPP module process the power of multiple cells. The string converter is used to adjust the PV output to that of the high-voltage battery voltage. In some embodiments, the system employs the vehicle's existing onboard charger as the string converter.

By leveraging the low-voltage battery 108' as a fixed voltage source over short time scales, the DPP units 106*a*', 106*b*', . . . , 106*n*' can operate without the need for centralized control or real-time communication/coordination among the DPP units, reducing costs and enabling scaling to larger counts of DPP units. In FIG. 2B, high-level, low-bandwidth control of the net current to or from the LV battery is achieved by the string converter, which controls its own input current. In contrast, in typical PV-to-isolated-bus architectures, maintaining the bus voltage is often non-trivial and usually requires high-bandwidth centralized control.

FIG. 2B shows that control over system power flow can be achieved by varying the current drawn by the string converter. A simple control strategy could direct power to or from each battery. In the example shown in FIG. 2B, the power generated by the PV cells (202*a*, 202*b*, . . . , 202*n*) is fixed as the sum of their individual MPPs; therefore, as the string converter (e.g., 202) draws more power ($I_{string}$ increases) (214), less power flows to the low-voltage battery ($I_{lvb}$ decreases). The current output 210 of the string converter (e.g., 202) can be increased (215) until the net current 212 to the low-voltage battery 108' is zero (216), maximizing power to the high-voltage battery (204; see FIG. 2A). Similarly, the current output 210 of the string converters (e.g., 202) can be reduced to zero (218), routing all power 212 to the low-voltage battery 108'. High values (220) of the string current 210 can cause the LV battery 108' to charge the HV battery 204, while negative string current 210 would do the opposite. Intermediate values of the string converter current 210 can charge both batteries (108' and 204) at the same time with any distribution.

FIGS. 2C and 2D show similar operations for the uninterruptible power supply. In FIG. 2D, the differential power processing (DPP) architecture is shown to have a high system efficiency despite using converters with the same efficiency, as compared to a base system shown in FIG. 2C. Specifically, in FIG. 2C, a baseline system having power converters is shown that can process a total power of loads of 280 W of cumulative loss with 90% system efficiency. In FIG. 2D, the power converters employing the exemplary system and method only process the difference in power between loads having only ~30 W of cumulative loss to provide 99% system efficiency.

Additional Example Systems

Figures 3A, 3B:
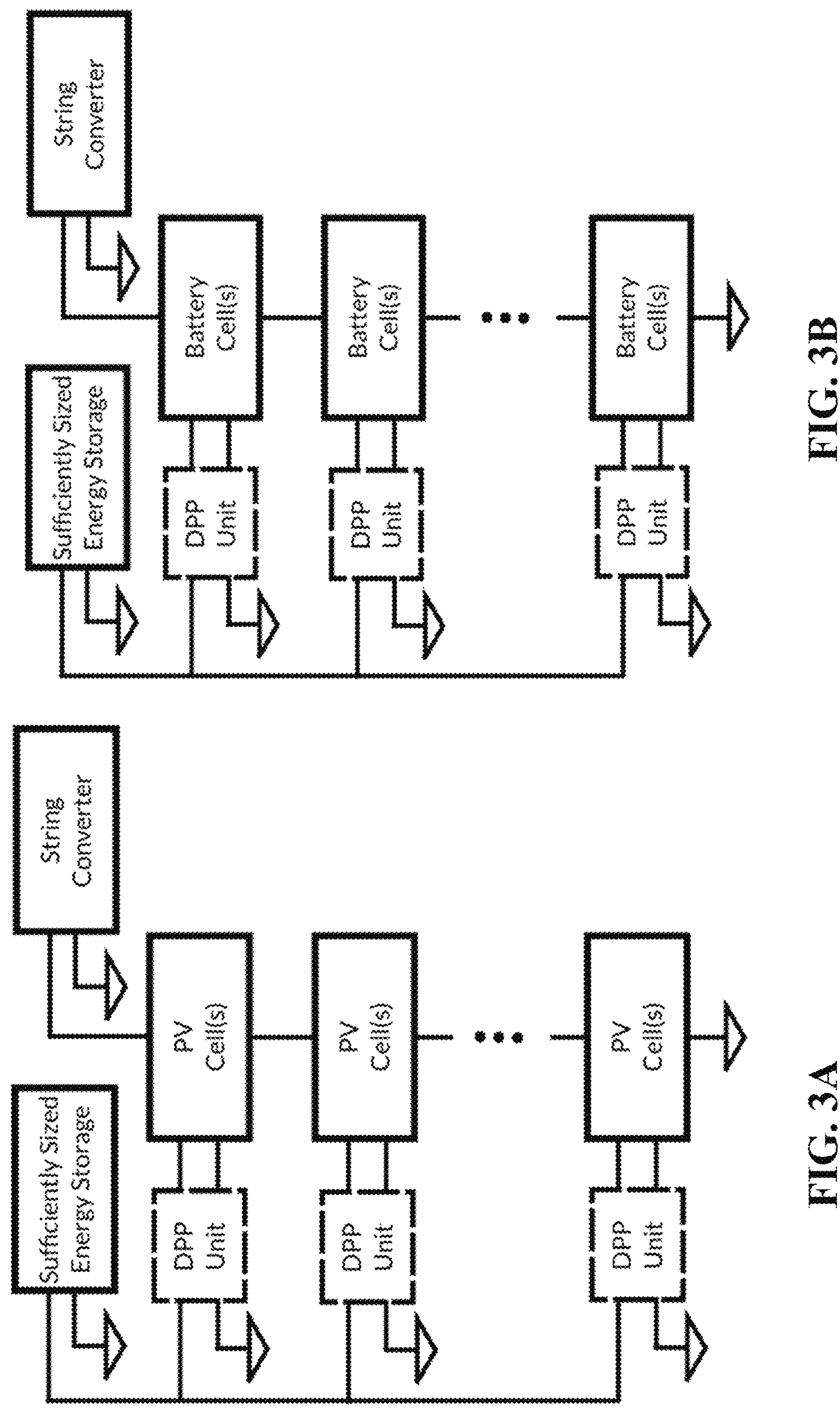
FIGS. 3A-3F each show an example configuration of the differential power processing (DPP) assembly of FIG. 1A or 1B for various applications.
Figures 3C, 3D:
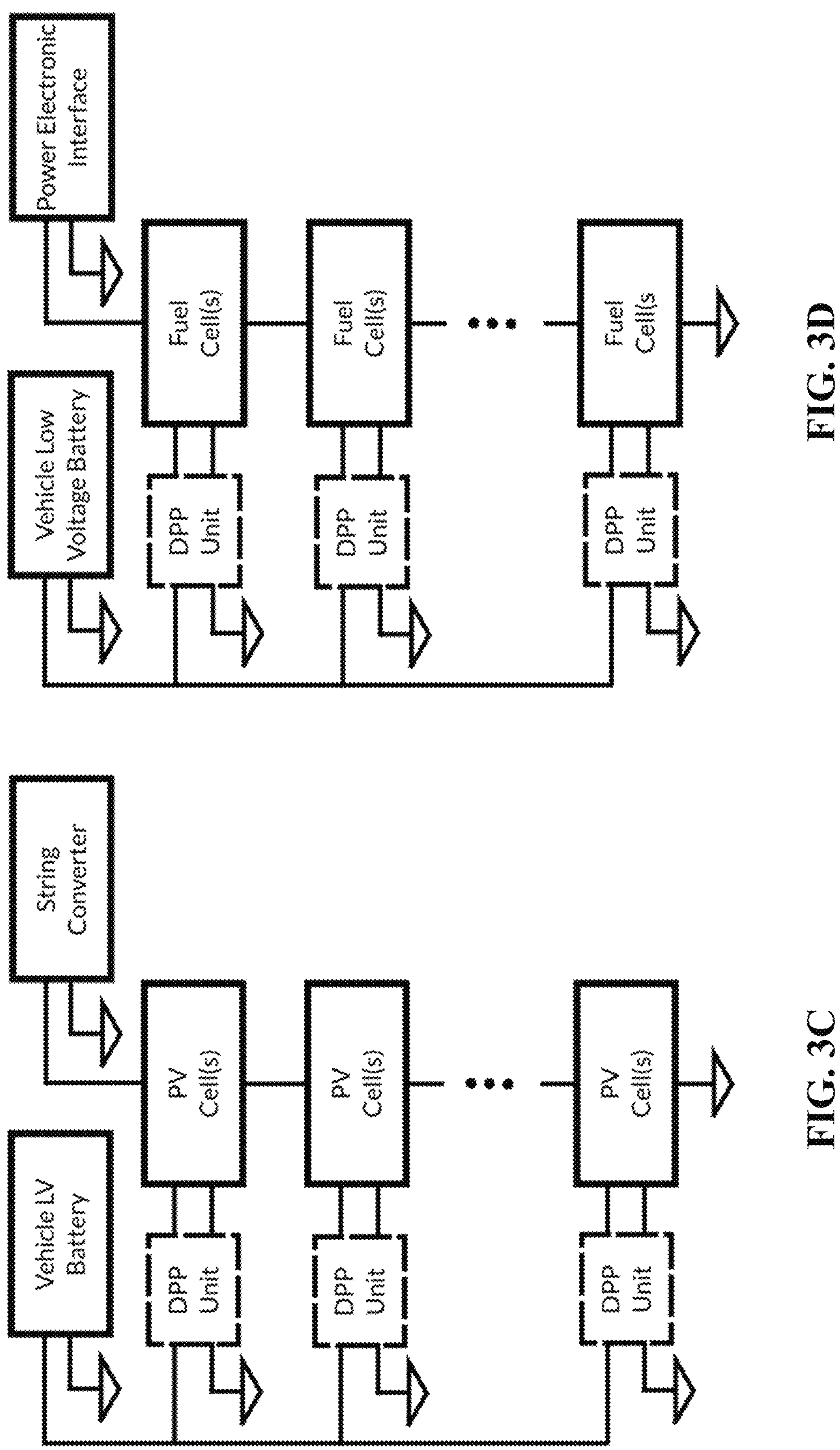
Figures 3E, 3F:
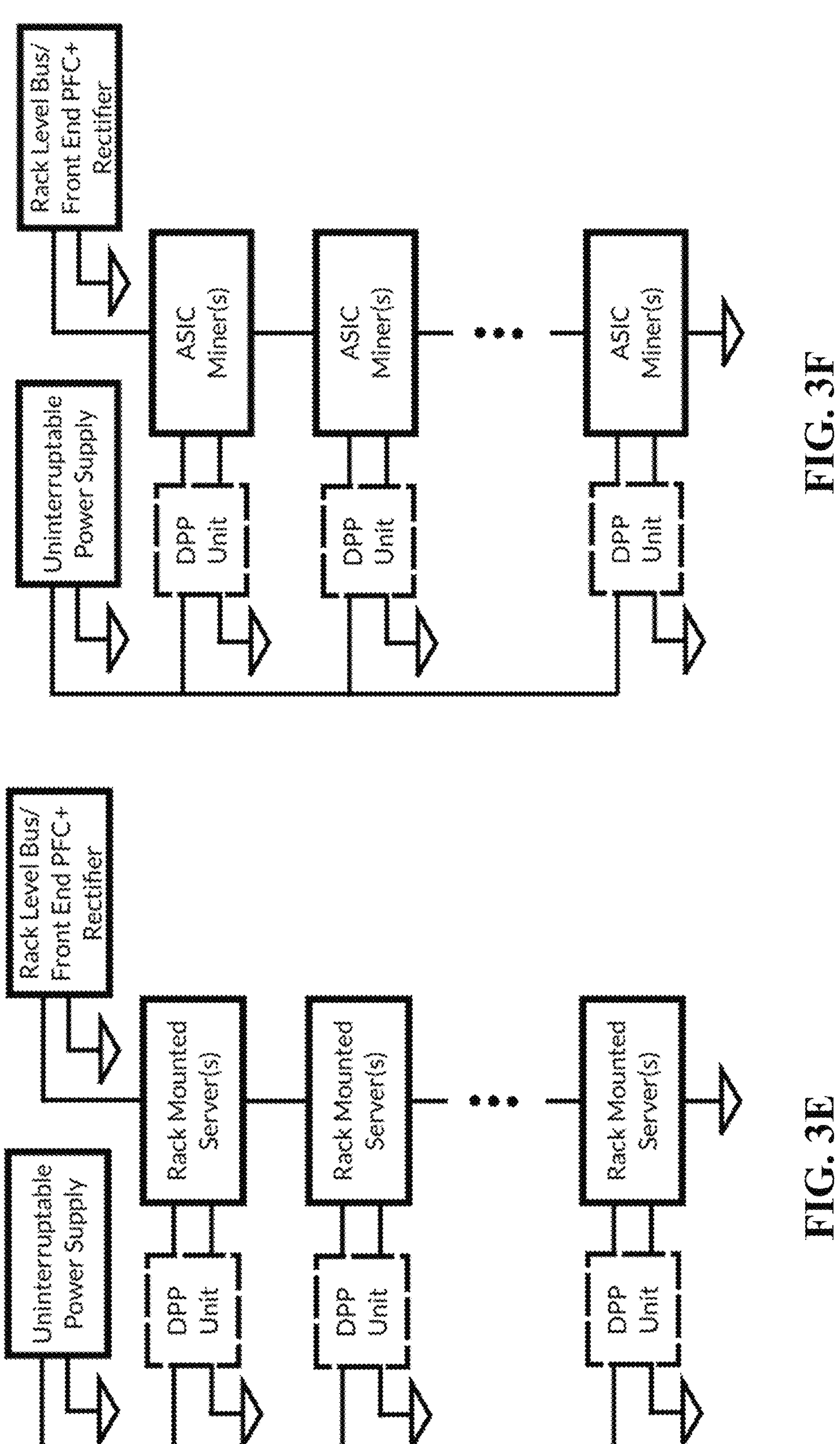

FIGS. 3A-3F each show an example configuration of the differential power processing (DPP) assembly of FIG. 1A or 1B for various applications. FIG. 3A shows the differential power processing (DPP) assembly employed for photovoltaic cells. FIG. 3B shows the differential power processing (DPP) assembly employed for battery cells. FIG. 3C shows the differential power processing (DPP) assembly employed for on-board photovoltaic cells with on-board vehicle batteries. FIG. 3D shows the differential power processing (DPP) assembly employed for on-board fuel cells with on-board vehicle batteries. FIG. 3E shows the differential power processing (DPP) assembly employed for an uninterruptible power supply for a rack server, e.g., in a data center. FIG. 3F shows the differential power processing (DPP) assembly employed for modularized computing hardware, e.g., cryptocurrency hardware as an A SIC miner for cryptocurrency.

Experimental Results and Additional Examples

A study was conducted to develop a PV-to-isolated-bus DPP architecture specifically for electric vehicle integration, and a converter module designed to be extensible and inexpensive. The exemplary architecture could employ the vehicle's existing low-voltage battery as the common bus for the DPP modules and reuse the existing onboard charger to interface the solar string to the high-voltage battery. The converter module could achieve maximum power point tracking (MPPT) for the cell(s) it is connected to without requiring any communication or power transfer across the isolation barrier, while allowing bidirectional power with synchronous rectification. The exemplary architecture can provide an inexpensive solution with high system efficiency and simple control that scales easily to large numbers of DPP units. FIGS. 2A-2B shows an example operation and topology of the exemplary architecture.

Figure 4A:
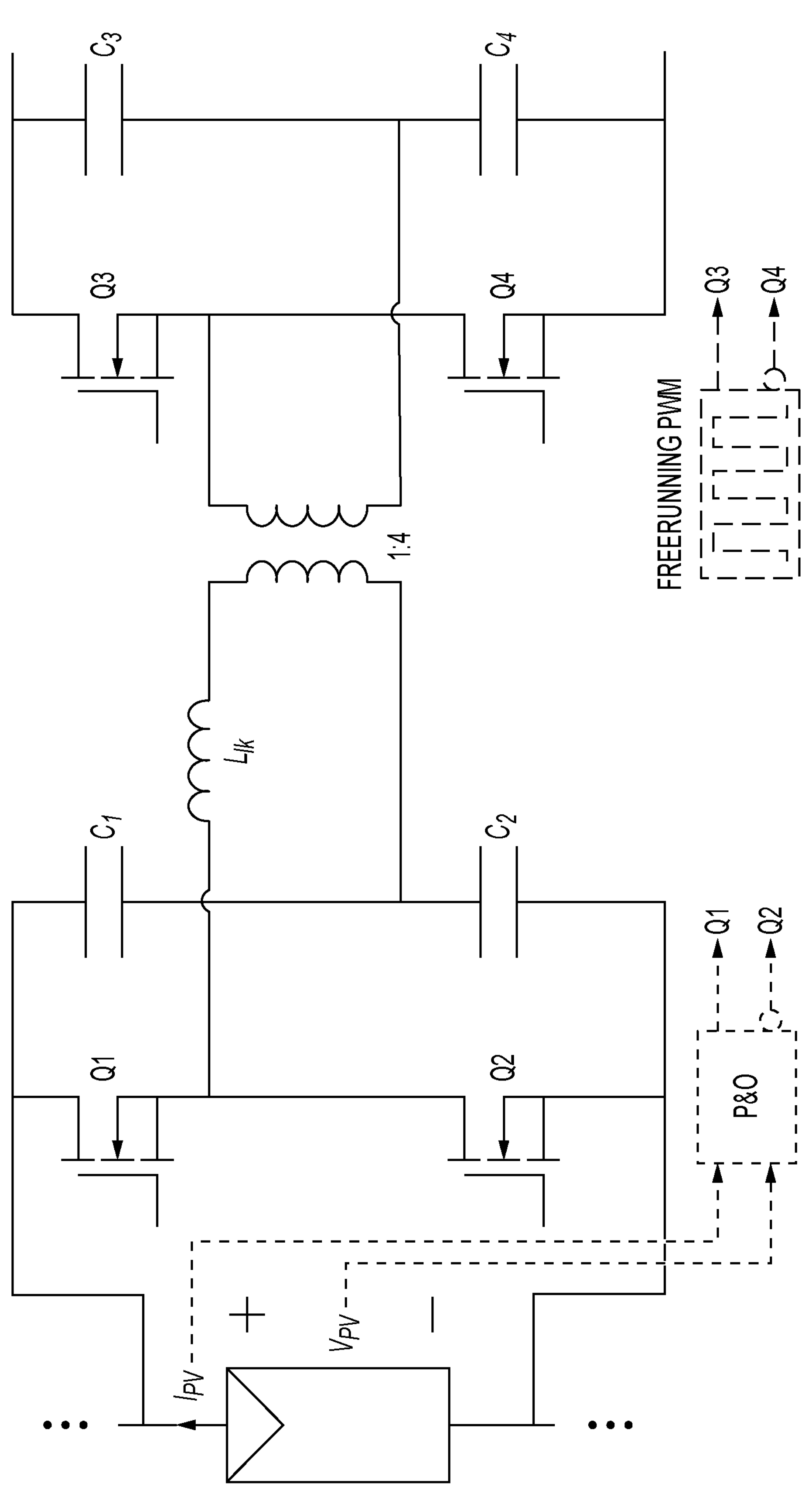
FIGS. 4A-4E show the test fixture and example DPP unit employed in a study.
Figure 4B:
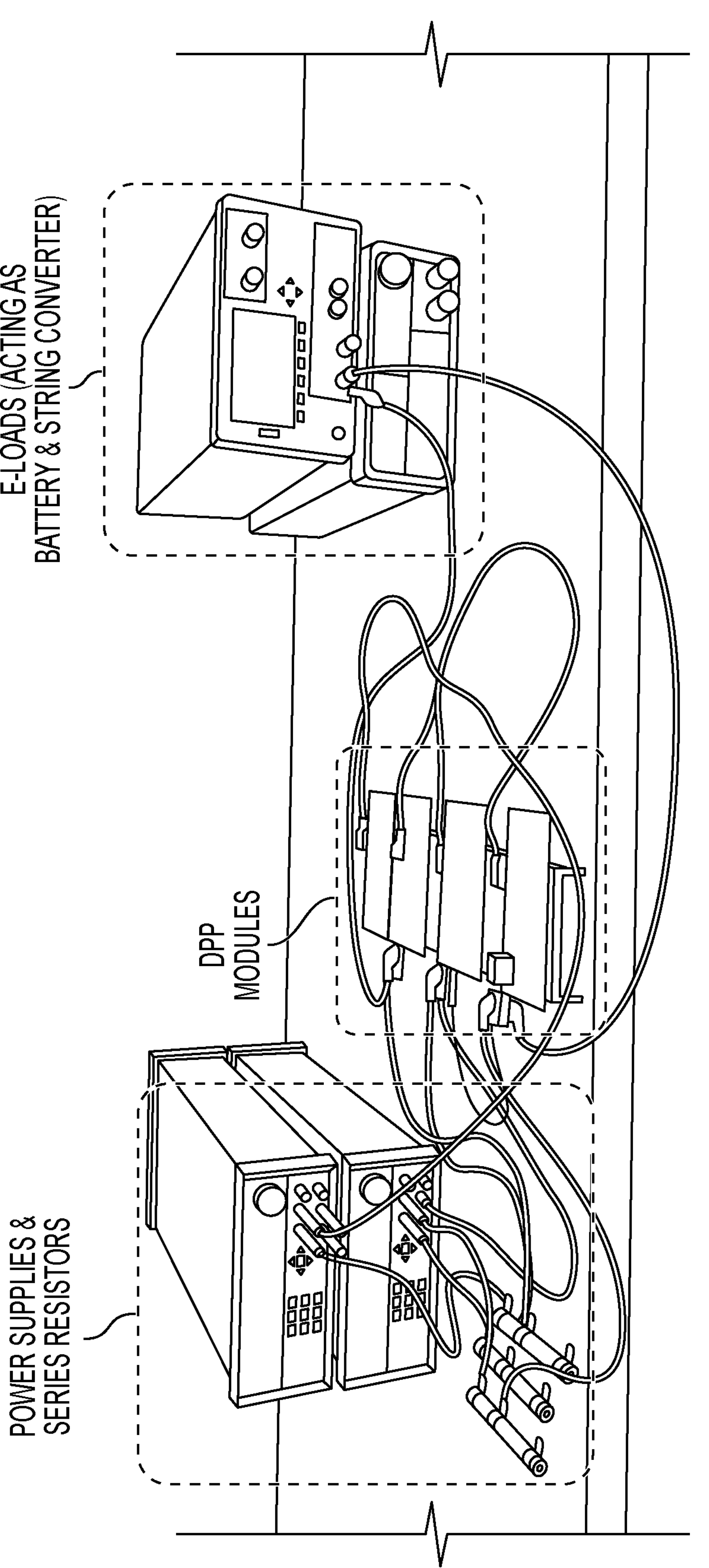
Figure 4C:
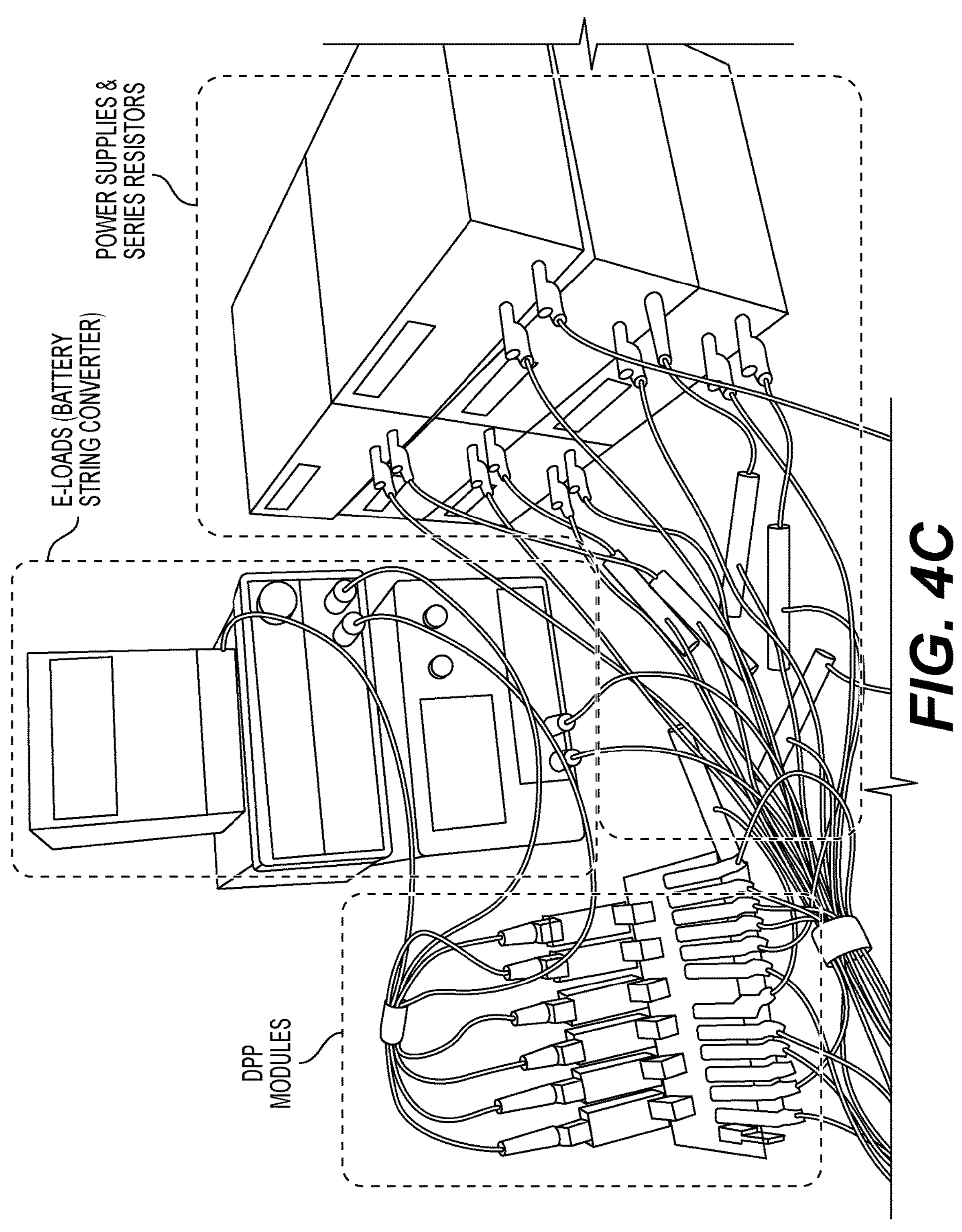
Figure 4D:
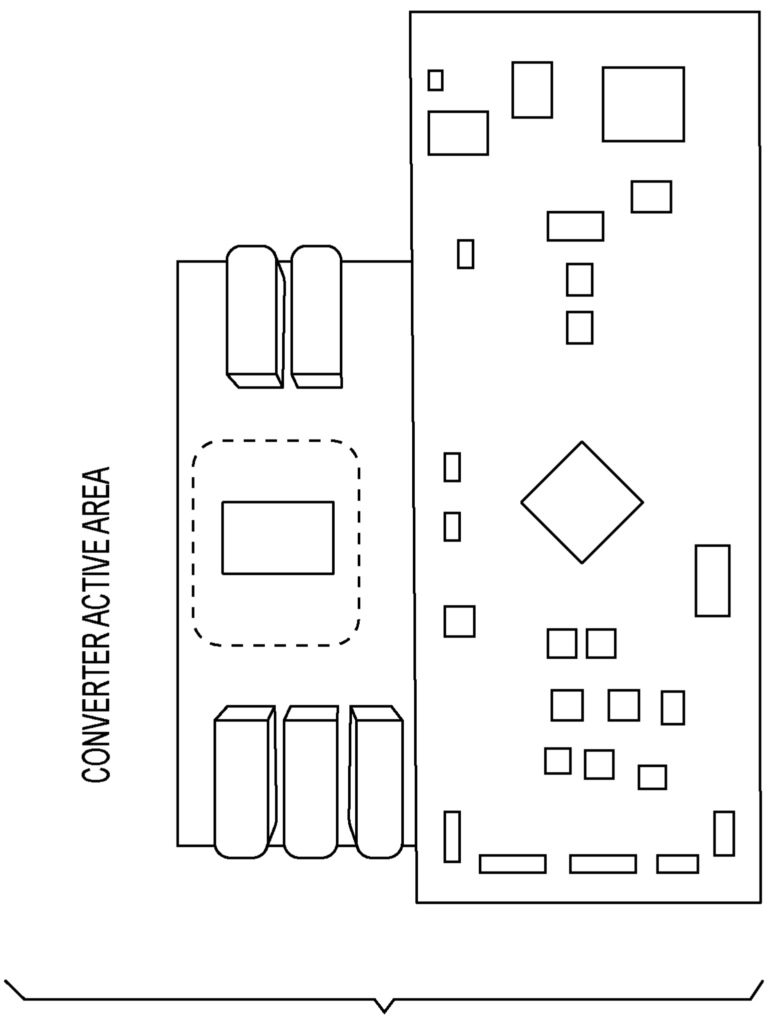
Figure 4D:
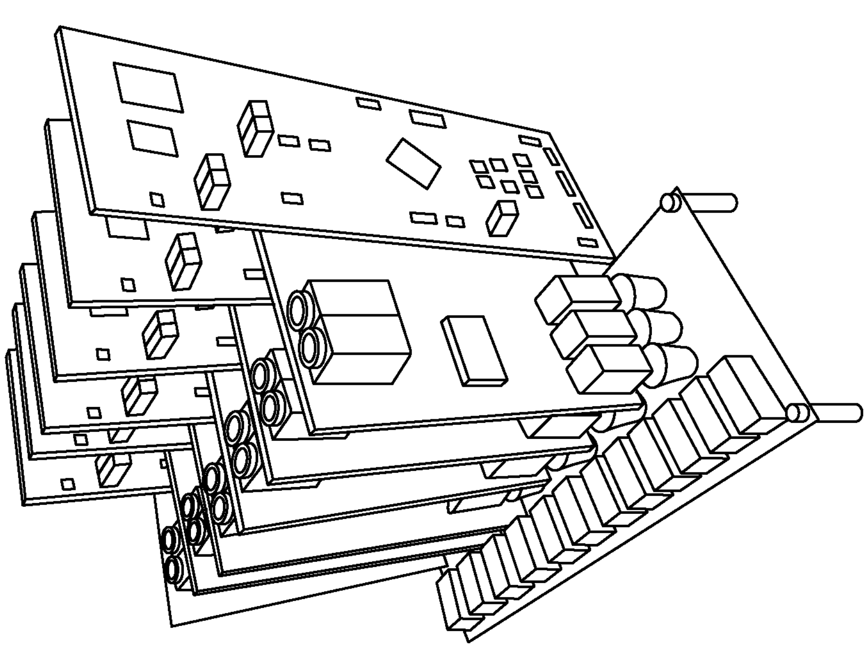

FIG. 4A shows a DPP unit with DAHB topology used in the study and selected for its low component count, bidirectionality, and isolation. FIGS. 4B and 4C show a test fixture, mounted with six DPP modules. FIG. 4D shows the Hardware prototype, showing the small active area of the DPP module.

Impact of Architecture. To quantify the advantages of the exemplary approach and guide the design decisions for the individual DPP modules, the study created a vehicle insolation and shading model in MATLAB. The solar panel was modeled as a string of 60 cells arranged in a 6 by 10 grid and electrically connected in series. The study modeled the effects of "linear" shading, i.e. a shading pattern that divides the panel into an insolated region and a shaded region (akin to the shadow of a building falling on a car roof), shown in FIG. 4E. For a given shading pattern, the study calculated the maximum power achievable using 3 bypass diodes (the conventional solution to partial shading) and for the proposed DPP approach.

FIGS. 5A-5C depict output power versus total panel insolation in hundreds of simulated partial shading conditions for conventional bypass diodes and various DPP configurations. Specifically, FIGS. 5A-5C show the calculated output power from hundreds of stochastically generated shading patterns. The x-axis shows the insolation of the panel as a fraction of maximum insolation (a totally shaded panel would be 0.0; a fully illuminated panel would be 1.0). FIG. 5A compares bypass diodes to DPP with 1 cell/module with varying efficiency. Less efficient modules can still extract more power. FIG. 5B compares bypass diodes to DPP with n=90% varying granularity. Lower granularity still outperforms bypass diodes. FIG. 5C shows average results with 6 PV cells per DPP unit at n=90%. FIG. 5D depicts that a slight frequency mismatch manifests as a drifting phase shift and can prevent successful control.

In FIG. 5A, the plot shows results using one DPP module per PV cell (the maximum level of granularity) with varying efficiency. While 100% efficient modules led to the absolute maximum available power, DPP units that were merely 75% efficient also led to very high system efficiency due to the differential power nature of the architecture. FIG. 5A demonstrates that modules can be made inexpensively without low efficiency being as much of a concern as it is in typical power converter design. Using 3 bypass diodes rarely gives better results than the 75% efficient DPP units, and often gives substantially worse results.

FIG. 5B shows a plot of results using a constant 90% efficiency with one DPP module per cell versus one DPP module for every six cells, as well as the results using bypass diodes. When one DPP unit was connected to six PV cells, the risk of partial shading was still a concern—a single fully shaded cell among a set of six would cause all six cells to produce no power. Nevertheless, this lower level of granularity continued to outperform bypass diodes in most cases, and usually by a substantial margin, as evidenced by the averaged data shown in FIG. 5C. While the total power rating of all of the DPP units was the same, no matter the granularity, cost does not scale linearly with power level and building fewer higher-power modules would often be more cost-effective than building many lower-power modules.

In summary, the exemplary architecture was observed to (i) enable greater output power in variable shading than traditional bypass diode approaches by using differential power processing, (ii) achieve high system efficiency despite potentially cheap and relatively inefficient individual DPP converters, (iii) require no centralized control, enabling scaling to many DPP units, and (iv) transfer power both to and (perhaps less usefully) from the vehicle low-voltage battery.

Module Design and Control. The exemplary architecture is, to some extent, agnostic of the converter topology used in individual converters so long as it is bidirectional and isolated. The DPP modules were implemented using the dual active half bridge (DAHB) topology shown in FIG. 4A, which has natural isolation and bi-directionality with low component count. The DAHB has the additional advantage of natural synchronous rectification, which is particularly important for low-voltage applications.

The study proposed a further cost-saving measure by implementing control without communication across the isolation barrier, which is possible with the dual active bridge topology. The DAHB is usually controlled by varying the phase shift between the primary and secondary half bridges [12]. The study observed that while it may be difficult for a controller to know the phase shift without some information transfer across the isolation barrier, typical closed-loop control does not require knowledge of the phase shift; it only requires a control variable that monotonically increases or decreases the transferred power. Therefore, a controller located on the primary can delay or advance the primary switching waveform without knowledge of the timing of the secondary switching waveform. In the instant study, the only task required of the DPP unit is to execute maximum power point tracking for its own cells; therefore, a primary-side controller can access the required information and execute the control without communicating across the isolation barrier.

The secondary PWM signal should match the primary PWM signal in frequency. Small frequency mismatch can be interpreted approximately as a drift in phase shift and an inability to properly perform MPPT, as illustrated in FIG. 5D. At the 500 kHz switching frequency of the implemented DPP modules, even a 1% difference in frequencies between primary and secondary gate signals would mean that the phase shift would drift by 360 degrees every 2 ms.

Figure 6A:
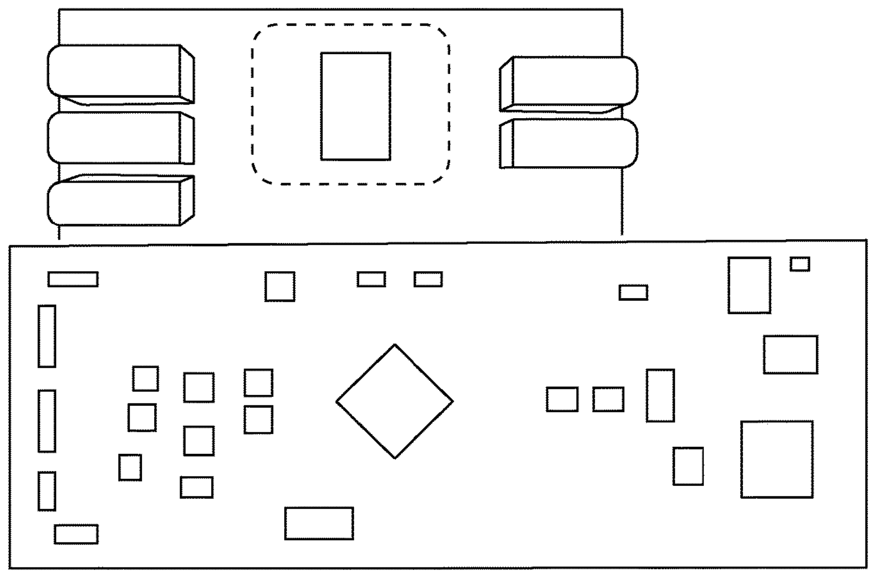
FIGS. 6A and 6B show a hardware prototype of a single DPP module.
Figure 6B:
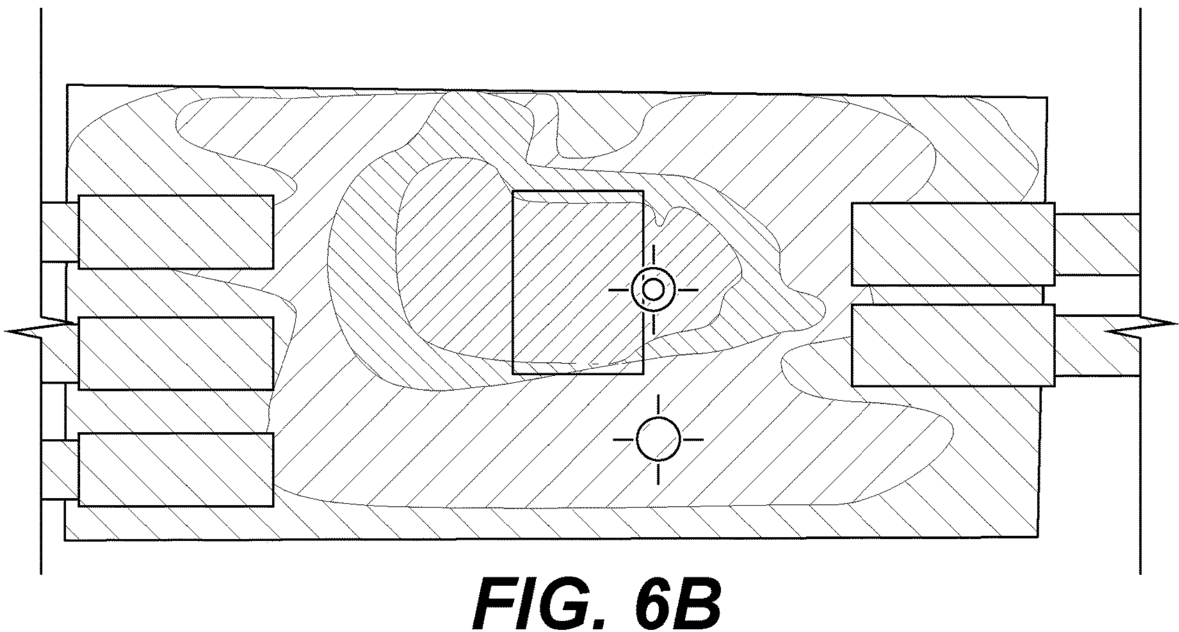

Single Module Validation. FIGS. 6A and 6B show a hardware prototype of a single DPP module. Specifically, FIG. 6A shows individual DPP modules implemented using dual active half-bridge converters switching at 500 kHz. High frequency operation was selected to minimize hardware volume. A partial list of components used is shown in Table 1. FIG. 6B shows a thermal image of the converter operating at approximately 10 W of input power, with a peak temperature of 117° F.

The converters were designed to interface with 6 solar cells each, optimized for an approximate input voltage of 3V. The converters used integrated planar magnetics to decrease volume and cost. Each converter had a 4-layer planar transformer with a one-to-four turns ratio-one turn was placed in parallel on layers 1 and 3, and two turns each were placed and connected in series on layers 2 and 4. Each converter should process a relatively small amount of power in well-matched situations (hundreds of milliwatts to a few watts), but must also be rated to process the full string current in a worst-case matching scenario.

Figure 7A:
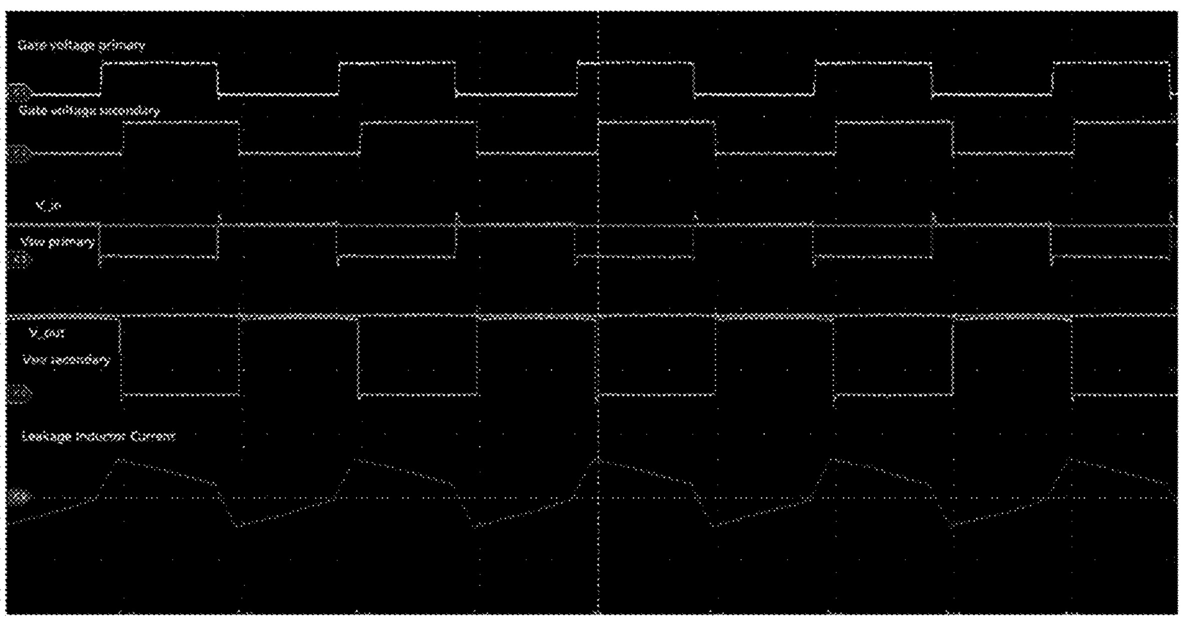
FIG. 7A depicts waveforms showing the operation of a DAHB converter on short timescales.

FIG. 7A depicts waveforms showing proper operation of a DAHB converter on short timescales. In FIG. 7A, the converters were optimized for light load operation, but other practical implementations of the approach may choose to optimize for different loading conditions, depending on their analysis of real-world operation.

Figure 7B:
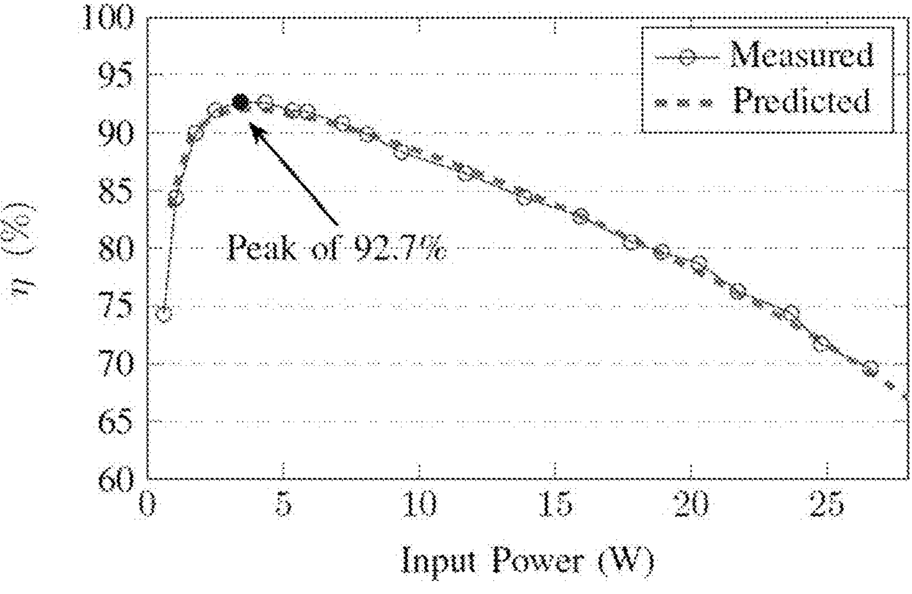
FIG. 7B depicts a measured efficiency curve of the DPP module converter, implemented using a dual-active half-bridge.

FIG. 7B depicts a measured efficiency curve of the DPP module converter, implemented using a dual-active half-bridge. It is optimized for lighter load operation. Based on the analysis presented above, this converter need not be highly efficient to have high system efficiency; for much of the load range, the prototype's efficiency is well over the 75% efficiency used to generate FIG. 5B. The low loss nature of this design was verified using finite element analysis (FEA) simulation, which estimates a primary self-resistance of approximately 2 milliohms and a secondary self-resistance of approximately 36 milliohms.

Figure 7C:
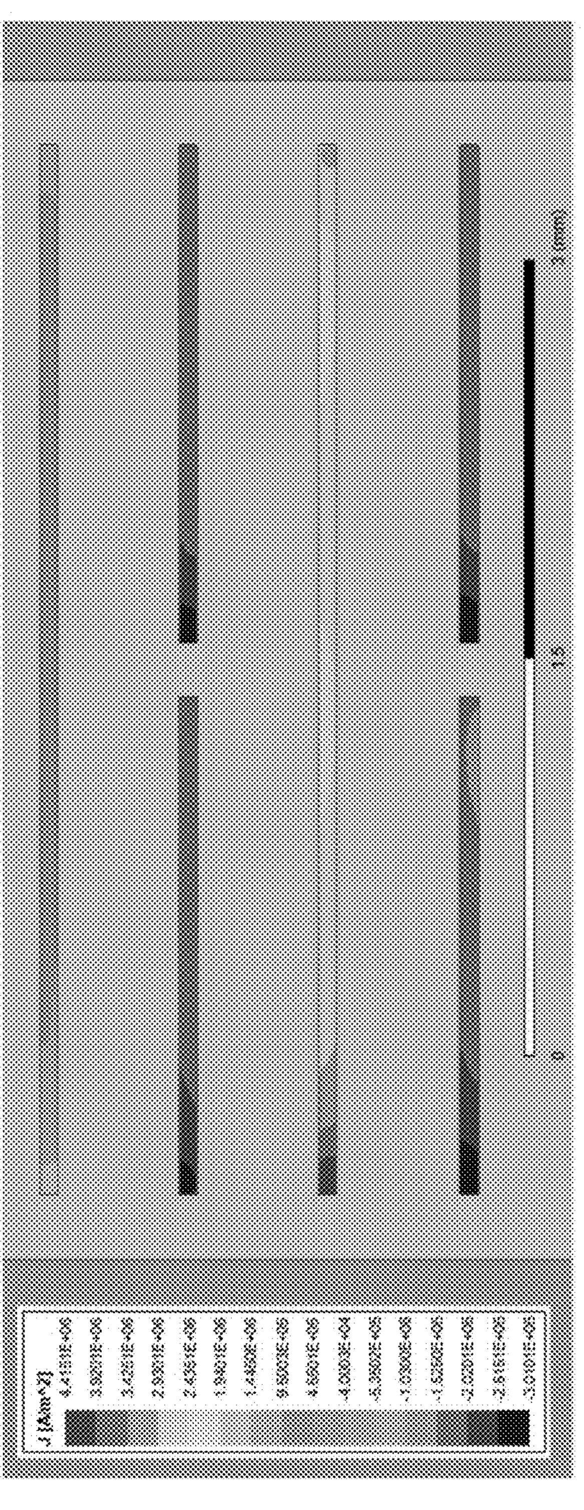
FIG. 7C depicts a 2D FEA simulation showing a relatively even current distribution between paralleled conductors in the cross-section of the planar transformer used in the DPP modules.

FIG. 7C depicts a 2D FEA simulation showing a relatively even current distribution between paralleled conductors in the cross-section of the planar transformer used in the DPP modules. The 2D FEA simulation demonstrates the relatively even distribution of currents between paralleled conductors.

TABLE 1

| DPP module hardware prototype components. Components | |
|---|---|
| Primary FETs | BSC026NE2LS5ATMA1 |
| Secondary FETs | RF4E110GNTR |
| Gate Driver | TPS28225 |
| Planar Transformer Core | 9580200602 |
| Primary Capacitors | 0603D106MAT2A (x3) |
| Secondary Capacitors | 0603C334JAT2A (x2) |
| Leakage Inductor | SRP2510A-R22M |

The study implemented a perturb-and-observe maximum power point tracking algorithm for the primary and free running of the secondary gate signals. To guarantee high accuracy, the secondary gate signals for all modules were generated from a single shared microcontroller unit. This means that, for an N-module implementation of the proposed architecture, N+1 microcontrollers would be needed. Nevertheless, in production, the secondary gate signals can be generated by any inexpensive oscillator with appropriate accuracy. As noted above, this allows all control to be housed on the primary side of the isolation barrier, with no need for communication with the secondary side.

Figure 7D:
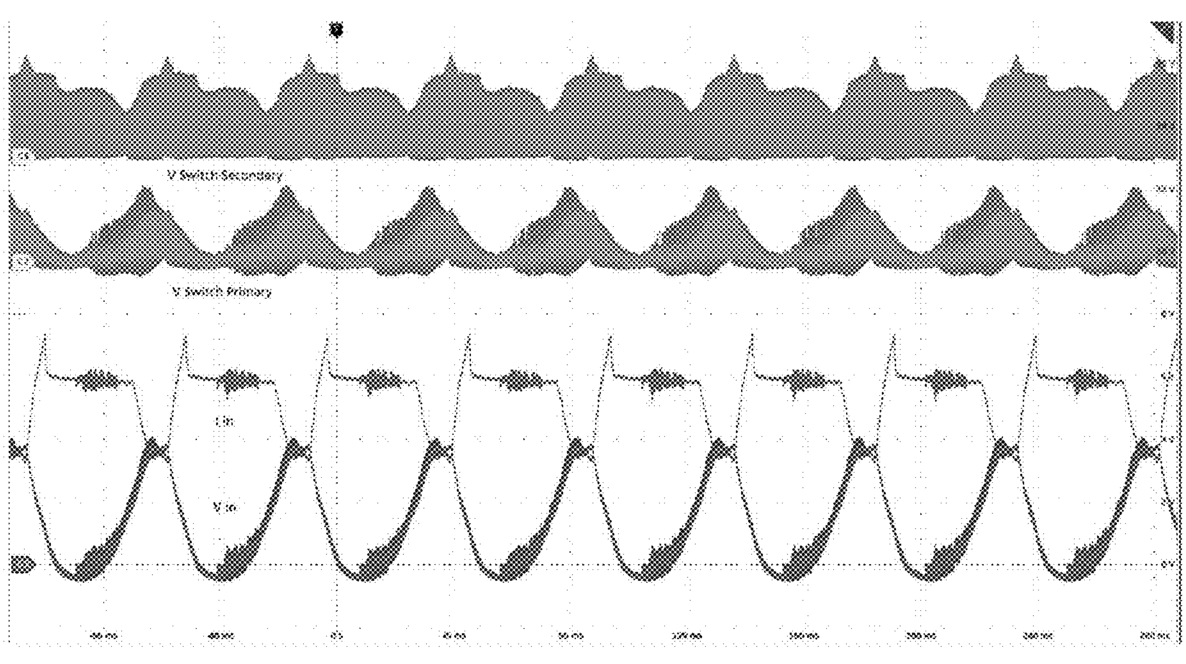
FIGS. 7D-7E depict input voltage, input current, and switch node voltage waveforms from an individual DPP module.
Figure 7E:
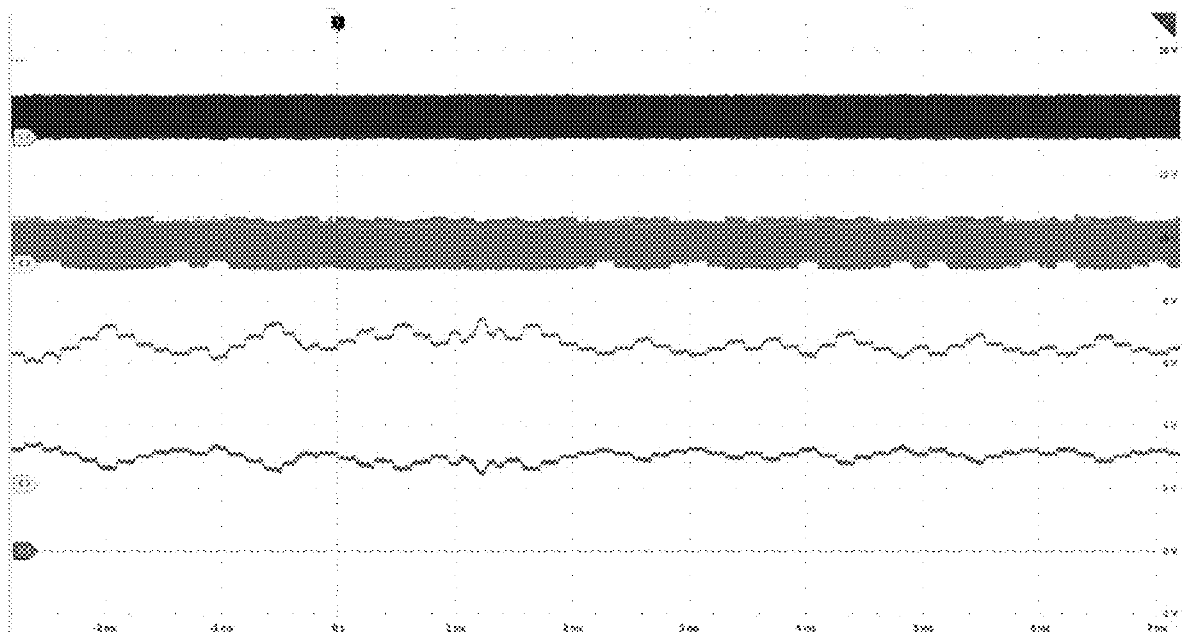

If the perturb and observe algorithm were not running, the slight difference in frequency between the primary and secondary gating signals resulted in instability, as a constant phase shift could not be maintained. FIGS. 7D-7E depict input voltage, input current, and switch node voltage waveforms from an individual DPP module. Specifically, FIG. 7D shows the result of open-loop operation, showing instability with a repetition rate of approximately 20 Hz. This suggests a 20 Hz mismatch (0.004% error) between the two 500 kHz PWM sources. FIG. 7D shows waveforms from an individual DPP module attempting to operate with constant phase shift, being affected by a slight frequency mismatch between primary & secondary PWM signals.

FIG. 7E shows waveforms from an individual DPP module performing MPPT, showing stability despite frequency mismatch between primary & secondary PWM signals. The perturb and observe algorithm thus both maintained the maximum power point and mitigated the effects of frequency mismatch. In FIG. 7E, the P&O algorithm successfully kept the converter in stable operation and found the MPP.

For the bootstrap operation, the study utilized the existing low-voltage battery attached to the converters' secondaries. The 12V signal was stepped down to 5V by an auxiliary buck converter. Because all control is housed on the primary, the microcontroller and primary gate drive supply voltages must be isolated, necessitating an additional isolated auxiliary DC/DC converter. Alternatively, one could power the primary side using the solar cells themselves or an auxiliary winding on the transformer.

Figure 4E:
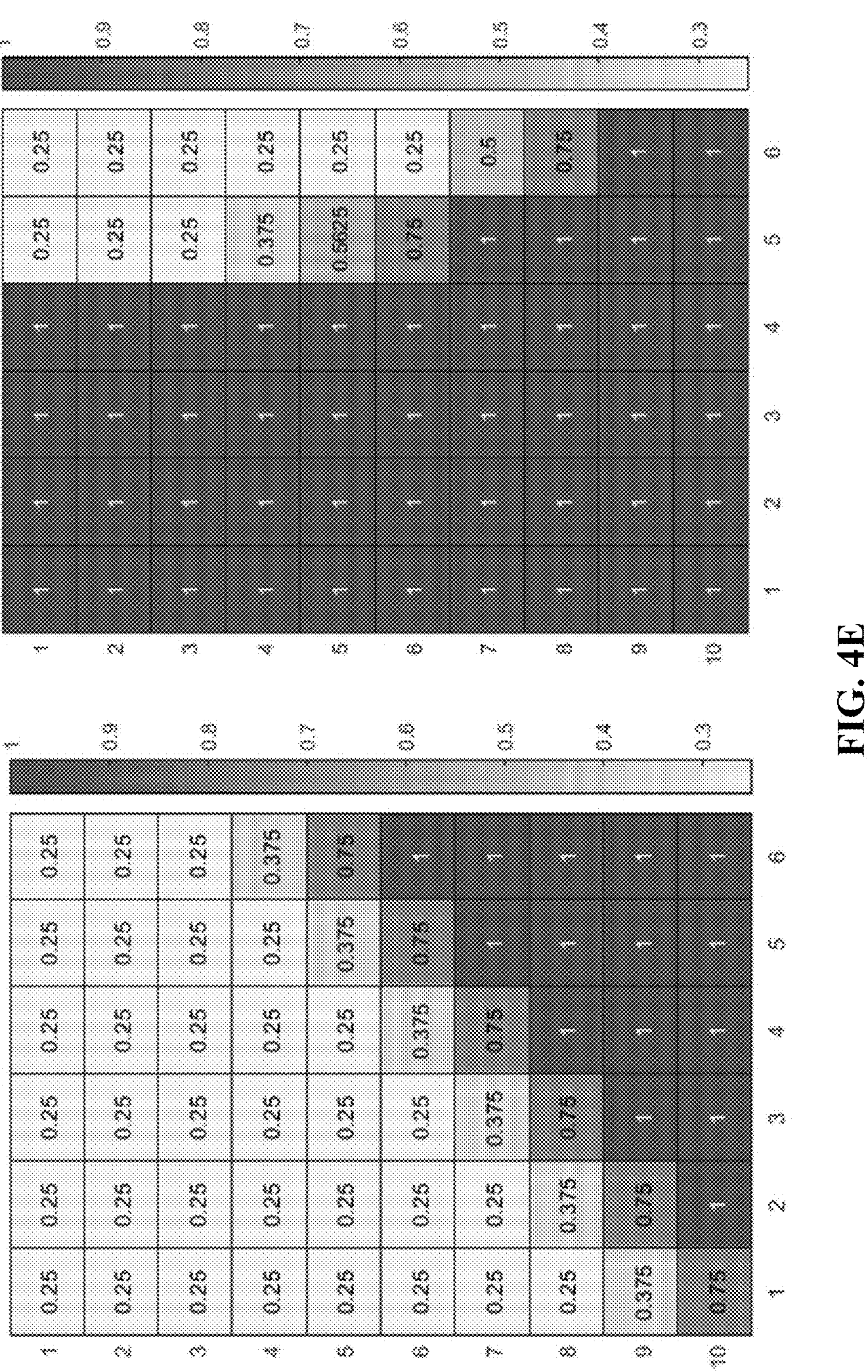

Multi-Module Operation Validation: To test full multi-module operation, the study built three identical DPP modules. Instead of using PV cells (which are hard to control in laboratory environments) or a PV simulator (which is typically scaled for panel-level, not cell-level simulation), each DPP module was connected to a power supply in series with a resistor. This yielded the salient features of a solar cell: an open-circuit voltage, a short-circuit current, and an easily identifiable maximum power point (the module input voltage will be one-half the power supply voltage). To simulate the secondary battery, a power supply was connected in parallel with an electronic load. This was necessary because the secondary must be able to both supply and absorb power from the DPP modules, depending on the operating condition. Another electronic load, configured as a controlled current sink, was used to act as the string converter in this experimental setup. FIGS. 4E-4G show the DPP hardware and the full testing setup.

Figure 7F:
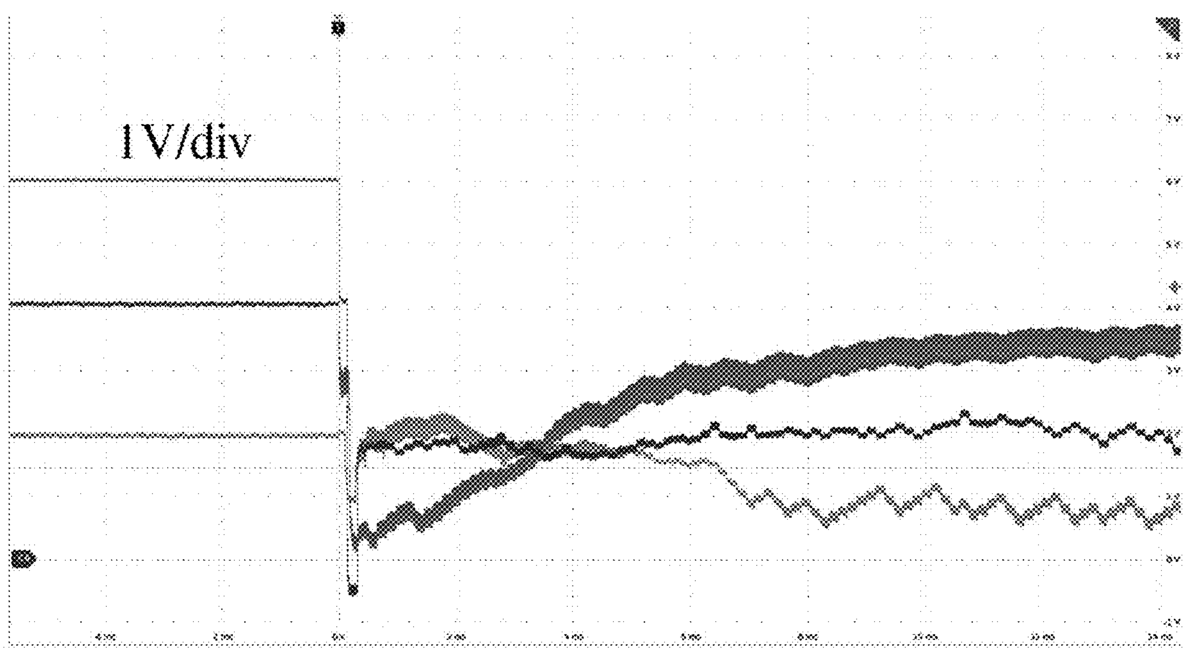
FIG. 7F depicts experimental waveforms showing the input voltages of the three DPP modules successfully converging to their local maximum power points upon startup.

The DPP modules were able to successfully track their local maximum power points. A perturb and observe algorithm was implemented, updating at approximately 6 kHz. FIG. 7F depicts experimental waveforms showing the input voltages of the three DPP modules successfully converging to their local maximum power points upon startup. Specifically, FIG. 7F shows the input voltages of three modules. Before start-up, when no current flows, they were equivalent to their respective local power supply voltages (2, 4, and 6 V). Upon startup, each module successfully performed MPPT and converged to its own MPP (module input voltages of 1, 2, and 3 V, respectively).

Figure 7G:
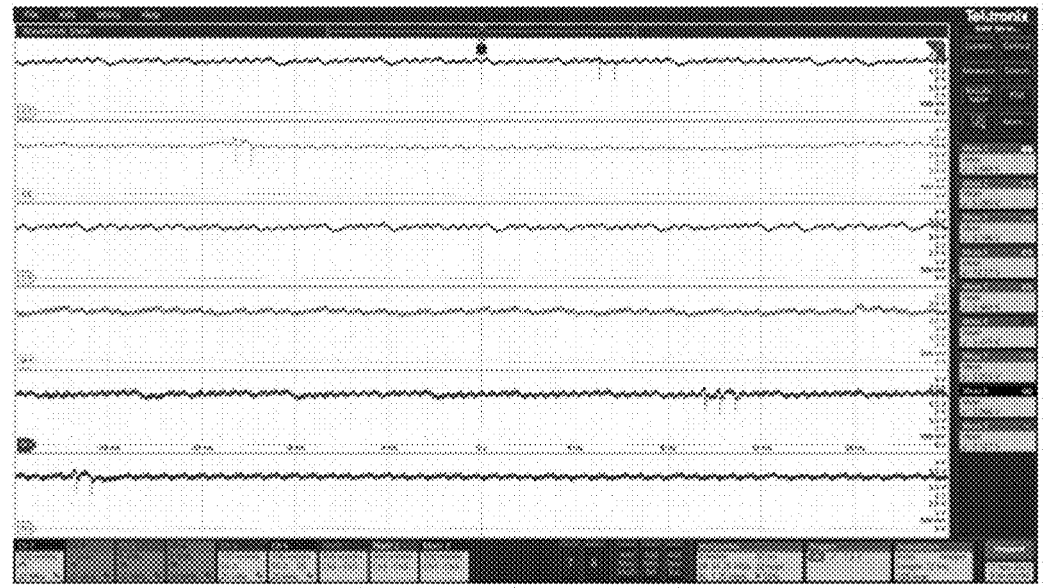
FIG. 7G shows the input voltages of six modules operating concurrently, with varied maximum power points (adjusted by changing the voltage of the associated power supply)

FIG. 7G shows the input voltages of six modules operating concurrently, with varied maximum power points (adjusted by changing the voltage of the associated power supply). Each DPP module maintains the individual maximum power point of its 'PV cells,' while having no communication with its own secondary or the other modules, indicating successful decentralized operation.

The resulting implementation is robust and can withstand transients both in the power output of the 'PV cells' and in the load. FIG. 7G shows the response from the converters as the power supply voltage of one of the modules was reduced. The two unaffected modules remained in their local maximum power points, while the affected module converged to a new MPP voltage in dozens of milliseconds (roughly 100 perturb and observe steps).

Figure 7H:
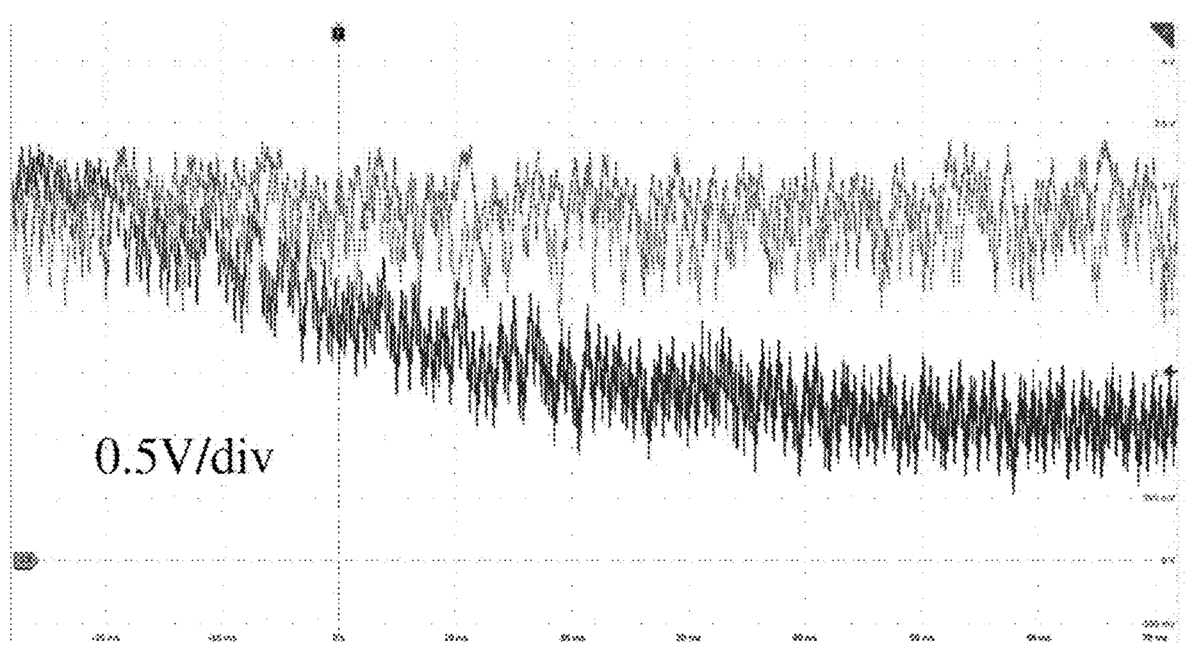
FIGS. 7H-7I depict experimental waveforms showing DPP modules' resiliency despite transients.
Figure 7I:
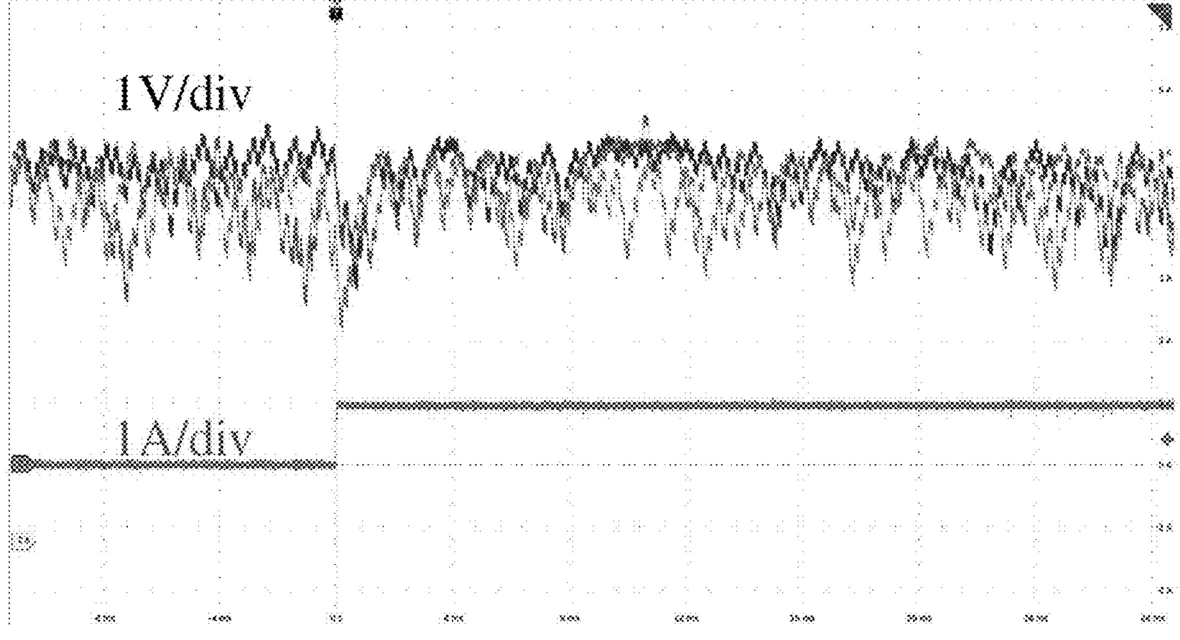

FIGS. 7H-7I depict experimental waveforms showing DPP modules' resiliency despite transients. Specifically, FIG. 7H shows voltage waveforms following a change in one module's input voltage, showing stability, and showing the response of the modules to a step-in-string converter current. The modules successfully maintained their MPPs.

FIG. 7I shows system efficiency with well-matched sources across a range of string currents, showing voltage and current waveforms showing stability after a step in string current. In this configuration, the string converter current determines how much power needs to be processed by the DPP modules. If the string current is zero, all power must be transferred to the low-voltage battery. In an ideal case, when the current to the low-voltage battery is zero, the DPP modules need not process any power at all, and system efficiency should be extremely high. In this condition, however, a system efficiency of 91% was measured. This is likely due to a combination of gating/switching loss and MPP tracking dynamics: because the converters are continuously perturbing the MPP, some current must be flowing into the DPP modules when the converters leave their respective MPPs.

Figure 7J:
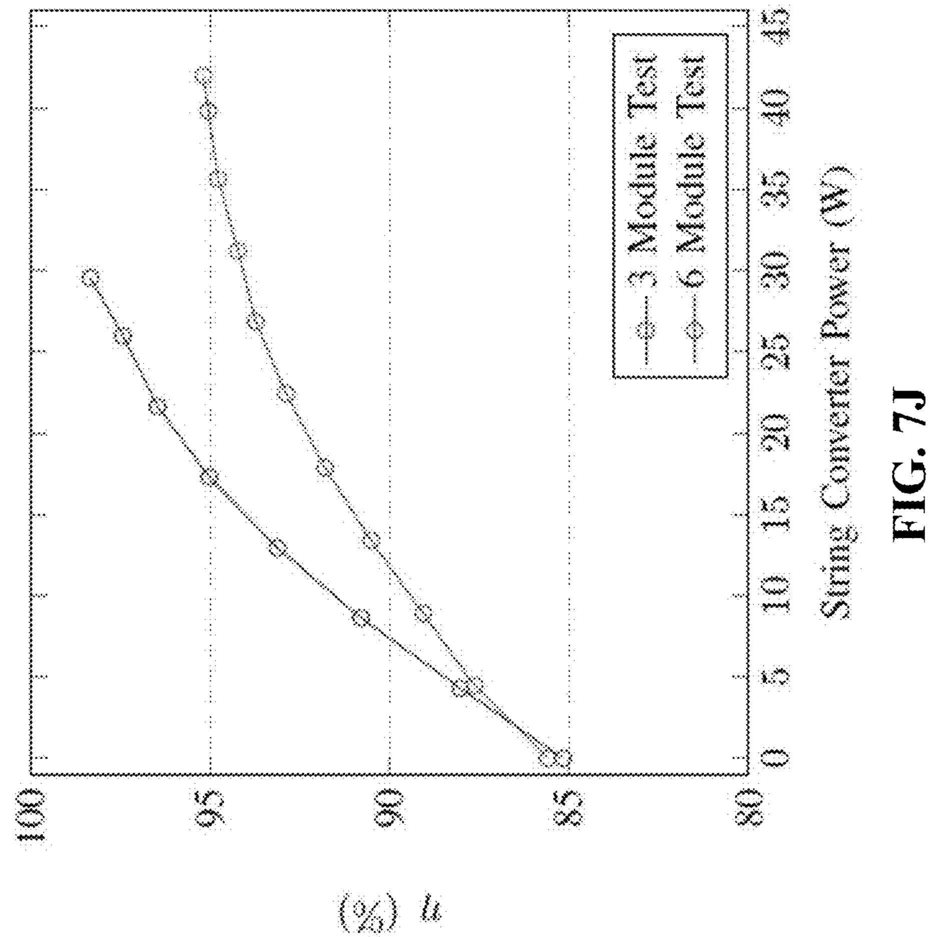
FIG. 7J depicts the measured efficiency of three DPP modules extracting power from well-matched sources.

FIG. 7J depicts the measured efficiency of three DPP modules extracting power from well-matched sources.

Discussion

There is increasing interest in integrating photovoltaics (PVs) into electric vehicles to charge the car battery and increase effective range by 5 to 10 miles per day [1]-[3], which is significant compared to the ~30 miles per day driven on average in the U.S. and even more significant globally [4]. Nevertheless, the incident power available is limited, and it is necessary to maximize the power harvested, even when the vehicle is shaded. While shading is unavoidable, typical solar installations can fall far short of harvesting even the incident power when only part of a panel is shaded (thereby preventing current from flowing even in illuminated cells). It is well known that even stationary utility-scale and residential solar installations may have problems with partial shading and mismatch [5]. These problems are expected to be more serious for a moving on-vehicle PV system with dynamic shading and unavoidable cell-to-cell power mismatch.

Traditional solar panels mitigate this problem by using bypass diodes connected in parallel with sections of PV strings. If one cell is shaded, the current can bypass that section through the diode without affecting the other sections of cells. This approach is simple, but still fails to generate a great deal of available power (a typical 60-cell string will be divided into three sections, with a 33% loss of power when a single cell is fully shaded and as much as 100% loss of power when three cells are fully shaded). Large numbers of bypass diodes can be used, but the efficiency of the system will suffer since the forward voltage drop of the diode is in the same order as the voltage of the solar cell.

An alternative approach is that of a DC optimizer, which uses power converters as an intermediary between sets of PV cells and the power converter outputs, which may be in parallel (e.g., microinverter architecture) or series. Each set of cells can be operated at its own maximum power point without interfering with other sets of cells. Critically, all of the power generated must be processed by power converters at least once, which requires the DC optimizer modules to be highly efficient at a high cost.

The differential power processing (DPP) architecture [6] achieves the granular maximum power point tracking capability of DC optimizers without the efficiency penalty. In a typical DPP architecture, power converter interfaces are provided (like the DC optimizer approach) to sections of cells that are otherwise in series (like the bypass diode approach). When the cells are well-matched, current flows through the cells without being processed by the power converters, achieving nearly 100% efficiency even if the power converters themselves are inefficient. When there is a mismatch among cells, the bidirectional DPP units only process the mismatch in the power (often small) towards or away from cells, maintaining high system efficiency.

DPP architectures may have the DPP secondaries connected to the main power bus (PV-to-bus), to an isolated bus (PV-to-isolated-bus), or to a neighboring PV section (PV-to-PV) [7], [8]. The PV-to-isolated-bus architecture requires the sum of DPP power ratings to be no more than the system power (unlike PV-to-PV) while allowing each DPP to operate at low voltage (unlike PV-to-bus); however, PV-to-isolated-bus typically has difficulty scaling to large module counts because of the difficulty of maintaining the isolated bus voltage [9]. Such implementations typically require control either through the isolation barrier or between multiple modules in order to successfully maintain the bus voltage and perform MPPT [10], [11]. A study was conducted to develop a proposed architecture that uses the low-voltage (LV) battery as the isolated bus, which shifts the question of regulating the isolated bus power to a much lower bandwidth. This approach also allows the system to charge the LV battery through a simple, distributed control strategy.

CONCLUSION

In this specification and in the claims that follow, reference will be made to a number of terms, which shall be defined to have the following meanings:

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used in the specification and the appended claims, the singular forms "a," "an" and "the" include plural referents unless the context clearly dictates otherwise. Thus, for example, reference to "a compound", "a composition", or "a cancer", includes, but is not limited to, two or more such compounds, compositions, or cancers, and the like.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not.

The following patents, applications, and publications, as listed below and throughout this document, are hereby incorporated by reference herein in their entirety.

REFERENCE LIST

[1] M. Abdelhamid, K. Rhodes, E. Christen, and D. Kok, "Solar panels on electrified vehicles: Applications and off-cycle co2 credit," SAE International Journal of Alternative Powertrains, vol. 7, no. 3, pp. 311-322, 2018.

[2] Brinks, "Vehicle solar panels case study," January 2022, press release.

[3] A. Leanse, "The 2023 toyota prius prime could take 3 weeks to recharge-without plugging in," MotorTrend, April 2023.

[4] T. Triplett, R. Santos, and S. Rosenbloom, "American driving survey: Methodology and year 1 results," The Urban Institute, April 2015.

[5] A. J. Hanson, C. A. Deline, S. M. MacAlpine, J. T. Stauth, and C. R. Sullivan, "Partial-shading assessment of photovoltaic installations via module-level monitoring," IEEE Journal of Photovoltaics, vol. 4, no. 6, pp. 1618-1624, 2014.

[6] P. S. Shenoy, K. A. Kim, B. B. Johnson, and P. T. Krein, "Differential power processing for increased energy production and reliability of photovoltaic systems," IEEE Transactions on Power Electronics, vol. 28, no. 6, pp. 2968-2979, 2013.

[7] H. Jeong, H. Lee, Y.-C. Liu, and K. A. Kim, "Review of differential power processing converter techniques for photovoltaic applications," IEEE Transactions on Energy Conversion, vol. 34, no. 1, pp. 351-360, 2019.

[8] C. Olalla, D. Clement, M. Rodriguez, and D. Maksimovic, "Archi-tectures and control of submodule integrated dc-dc converters for photovoltaic applications," IEEE Transactions on Power Electronics, vol. 28, no. 6, pp. 2980-2997, 2013.

[9] J.-H. Lim, D.-I. Lee, Y.-J. Hyeon, and H.-S. Youn, "Differential power processing converter with active clamp structure and integrated planar transformer for power generation optimization of multiple photovoltaic submodules," IEEE Access, vol. 11, pp. 5668-5678, 2023.

[10] G. Chu and H. Wen, "Design and optimization of pv-isolated-port photovoltaic differential power processing system," in 2018 IEEE Inter-national Conference on Power Electronics, Drives and Energy Systems (PEDES), 2018, pp. 1-6.

[11] G. Chu, H. Wen, L. Jiang, Y. Hu, and X. Li, "Bidirectional flyback based isolated-port submodule differential power processing optimizer for photovoltaic applications," Solar Energy, vol. 158, pp. 929-940, 2017.

[12] P. He and A. Khaligh, "Comprehensive analyses and comparison of 1 kw isolated dc-dc converters for bidirectional ev charging systems," IEEE Transactions on Transportation Electrification, vol. 3, no. 1, pp. 147-156, 2017.

What is claimed is:

1. A system comprising:

a plurality of differential power processing (DPP) units, including a first DPP unit and a second DPP unit, each of the first DPP unit and the second DPP unit comprising a bi-directional converter having a first connection and a second connection, wherein the first connection of the first DPP unit and the first connection of the second DPP unit are connected (i) to a first set of variable power source or sink unit and a second set of variable power source or sink unit, respectively, wherein the first connection of the first DPP unit is coupled to the first variable power source or sink unit and is configured to push or pull, differentially, power for the first variable power source or sink unit when there is a mismatch between (i) the first variable power source or sink unit and (ii) another variable power source or sink unit, and wherein the first connection of the second DPP unit is coupled to the second variable power source or sink unit and is configured to push or pull, differentially, power for the second variable power source or sink unit when there is a mismatch between the second power source or sink unit and another variable power source or sink unit;

wherein each second connection of the plurality of DPP units is coupled to one or more energy storage units in a bus, wherein the energy storage is sufficiently sized to mitigate transient conditions propagated from a plurality of variable power source or sink units, including the first and second variable power source or sink units, to be fully absorbed or drawn from the energy storage.

2. The system of claim 1, wherein each of the first DPP unit and a second DPP unit each includes a distributed controller, wherein the distributed controller of the first DPP unit is configured to control voltage that appears across, and/or current that flows through, the first variable power source or sink unit as a first photovoltaic cell without control input from other controllers of other DPP units, and wherein the distributed controller of the second DPP unit is configured to control voltage that appears across, and/or the current that flows through, the second variable power source or sink unit without control input from other controllers of other DPP units.

3. The system of claim 1, wherein each of the first DPP unit and a second DPP unit each includes a distributed controller, wherein the distributed controller of the first DPP unit is configured to track voltage of the first variable power source or sink unit as a first set of one or more rack servers without control input from other controllers of other DPP units, and wherein the distributed controller of the second DPP unit is configured to control voltage that appears across, and/or current that flows through, the second variable power source or sink unit as a second set of one or more rack servers without control input from other controllers of other DPP units.

4. The system of claim 1, wherein each of the first DPP unit and a second DPP unit is connected to a central controller.

5. The system of claim 1 further comprising:

a plurality of photovoltaic cells connected in series, including a first photovoltaic cell and a second photovoltaic cell;

the energy storage coupled to the plurality of DPP units, the energy storage coupled in parallel connection to the second connection of each of the plurality of DPP units to form the bus.

6. The system of claim 5, wherein the plurality of photovoltaic cells are integrated into a vehicle, and wherein the energy storage is an onboard vehicle battery, the onboard vehicle battery being configured to provide bus tolerant to high-frequency power imbalances.

7. The system of claim 5, wherein the plurality of photovoltaic cells are integrated into a vehicle, wherein the energy storage comprises onboard vehicle battery, the onboard vehicle battery being configured to provide bus tolerant to high-frequency power imbalances.

8. The system of claim 5, wherein the first DPP unit is configured to operate a maximum power point control for the first photovoltaic cell, and wherein the second DPP unit is configured to operate a maximum power point control for the second photovoltaic cell.

9. The system of claim 1, wherein the energy storage is a rack-mounted uninterruptable power supply.

10. The system of claim 9, wherein the first variable power source or sink unit and the second variable power source or sink unit are computational loads.

11. The system of claim 9, wherein the first DPP unit is configured to maintain constant voltage for a bus to a set of one or more computing equipment, and wherein the second DPP unit is configured to maintain constant voltage for a bus to a second set of one or more computing equipment.

12. The system of claim 1, wherein each of the plurality of DPP units comprises a dual active half bridge (DAHB) converter or a bidirectional converter.

13. The system of claim 1, wherein at least one of the plurality of DPP units comprises a dual active half bridge (DAHB) converter or a bidirectional converter configured to operate at a switching frequency above 100 KHz.

14. The system of claim 9, wherein the plurality of DPP units each includes an integrated planar magnetic component.

15. A method comprising:

providing a plurality of differential power processing (DPP) units, including a first DPP unit and a second DPP unit, each of the first DPP unit and the second DPP unit comprising a bi-directional converter having a first connection and a second connection;

coupling the first connection of the first DPP unit to a first variable power source or sink unit, wherein the first connection of the first DPP is configured to push or pull, differentially, power for the first variable power source or sink unit when there is a mismatch between (i) the first variable power source or sink unit and (ii) another variable power source or sink unit;

coupling the first connection of the second DPP unit to a second variable power source or sink unit, wherein the first connection of the second DPP is configured to push or pull, differentially, power for the second variable power source or sink unit when there is a mismatch between the second power source or sink unit and another variable power source or sink unit; and coupling each second connection of the plurality of DPP units to one or more energy storage units in a bus, wherein the energy storage is sufficiently sized to mitigate transient conditions propagated from a plurality of variable power source or sink units, including the first and second variable power source or sink units, to be fully absorbed or drawn from the energy storage.

16. The method of claim 15 further comprising:

controlling voltage appearing across, and/or current flowing through, the first variable power source or sink unit using a distributed controller of the first DPP unit without control input from other controllers of other DPP units; and controlling voltage appearing across, and/or current flowing through, the second variable power source or sink unit using a distributed controller of the second DPP unit without control input from other controllers of other DPP units.

17. The method of claim 15 further comprising:

tracking voltage of the first variable power source or sink unit using a distributed controller of the first DPP unit, as a first set of one or more rack servers, without control input from other controllers of other DPP units; and controlling voltage appearing across, and/or current flowing through, the second variable power source or sink unit using a distributed controller of the second DPP unit, as a second set of one or more rack servers, without control input from other controllers of other DPP units.

18. The method of claim 15 further comprising:

coupling a plurality of photovoltaic cells, including a first photovoltaic cell and a second photovoltaic cell connected in series, to the plurality of DPP units; and coupling an energy storage to the plurality of DPP units, the energy storage coupled in parallel connection to the second connection of each of the plurality of DPP units to form the bus.

19. The method of claim 18, wherein the plurality of photovoltaic cells are integrated into a vehicle, and wherein the energy storage is an onboard vehicle battery, the onboard vehicle battery being configured to provide bus tolerant to high-frequency power imbalances.

20. The method of claim 18, wherein the first DPP unit is configured to operate a maximum power point control for the first photovoltaic cell, and wherein the second DPP unit is configured to operate a maximum power point control for the second photovoltaic cell.

* * * * *